United States Patent
Maeda

(10) Patent No.: US 6,798,977 B2
(45) Date of Patent: Sep. 28, 2004

(54) IMAGE DATA ENCODING AND DECODING USING PLURAL DIFFERENT ENCODING CIRCUITS

(75) Inventor: Mitsuru Maeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/241,871

(22) Filed: Feb. 2, 1999

(65) Prior Publication Data

US 2003/0147462 A1 Aug. 7, 2003

(30) Foreign Application Priority Data

Feb. 4, 1998 (JP) .......................................... 10-023279

(51) Int. Cl.⁷ .......................... H04N 5/91; H04N 7/04; H04N 7/06; H04N 7/08; H04N 7/52; H04N 7/26; H04N 7/12; H04N 11/02; H04N 11/04

(52) U.S. Cl. ..................... 386/111; 386/109; 375/240.1

(58) Field of Search ......................... 386/111–112, 33; 375/240.03, 240.08, 240.1, 240.11–240.16; 382/232, 234, 236, 238, 251

(56) References Cited

U.S. PATENT DOCUMENTS

| | | | | |
|---|---|---|---|---|
| 5,283,646 A | * | 2/1994 | Bruder .......................... 341/76 |
| 5,552,829 A | * | 9/1996 | Kim et al. .............. 375/240.04 |
| 5,729,295 A | * | 3/1998 | Okada ................... 375/240.13 |
| 5,841,470 A | * | 11/1998 | Welsh ...................... 375/240.1 |
| 5,845,088 A | * | 12/1998 | Lewis ...................... 375/240.1 |
| 5,883,678 A | * | 3/1999 | Yamaguchi et al. ..... 348/390.1 |
| 5,886,743 A | * | 3/1999 | Oh et al. ............... 375/240.02 |
| 5,907,361 A | * | 5/1999 | Okada ........................ 348/700 |
| 5,929,912 A | * | 7/1999 | Aono et al. ............ 375/240.11 |
| 5,953,488 A | * | 9/1999 | Seto ........................... 386/109 |
| 5,986,708 A | * | 11/1999 | Katata et al. ............ 375/240.1 |
| 6,075,619 A | * | 6/2000 | Iizuka ........................ 358/539 |
| 6,084,636 A | * | 7/2000 | Sugahara et al. ...... 375/240.03 |
| 6,148,030 A | * | 11/2000 | Katata et al. ............ 375/240.1 |
| 6,151,413 A | * | 11/2000 | Jang ...................... 375/240.08 |
| 6,233,356 B1 | * | 5/2001 | Haskell et al. .............. 382/243 |
| 6,301,303 B1 | * | 10/2001 | Chung et al. .......... 375/240.08 |
| 6,307,885 B1 | * | 10/2001 | Moon et al. ........... 375/240.08 |
| 6,330,280 B1 | * | 12/2001 | Suzuki et al. .......... 375/240.08 |
| 6,414,991 B1 | * | 7/2002 | Yagasaki et al. ....... 375/240.12 |
| 6,512,793 B1 | | 1/2003 | Maeda .................. 375/240.08 |

* cited by examiner

Primary Examiner—Thai Tran
Assistant Examiner—Polin Chieu
(74) Attorney, Agent, or Firm—Fitzpatrick, Cella, Harper & Scinto

(57) ABSTRACT

In an image processing apparatus and method, a plurality of objects are separated from input moving image data. The separated first object is encoded by a first encoding method. The separated second object is encoded by a second encoding method. The encoding process for the second object is controlled in accordance with encoded data of the first object.

27 Claims, 18 Drawing Sheets

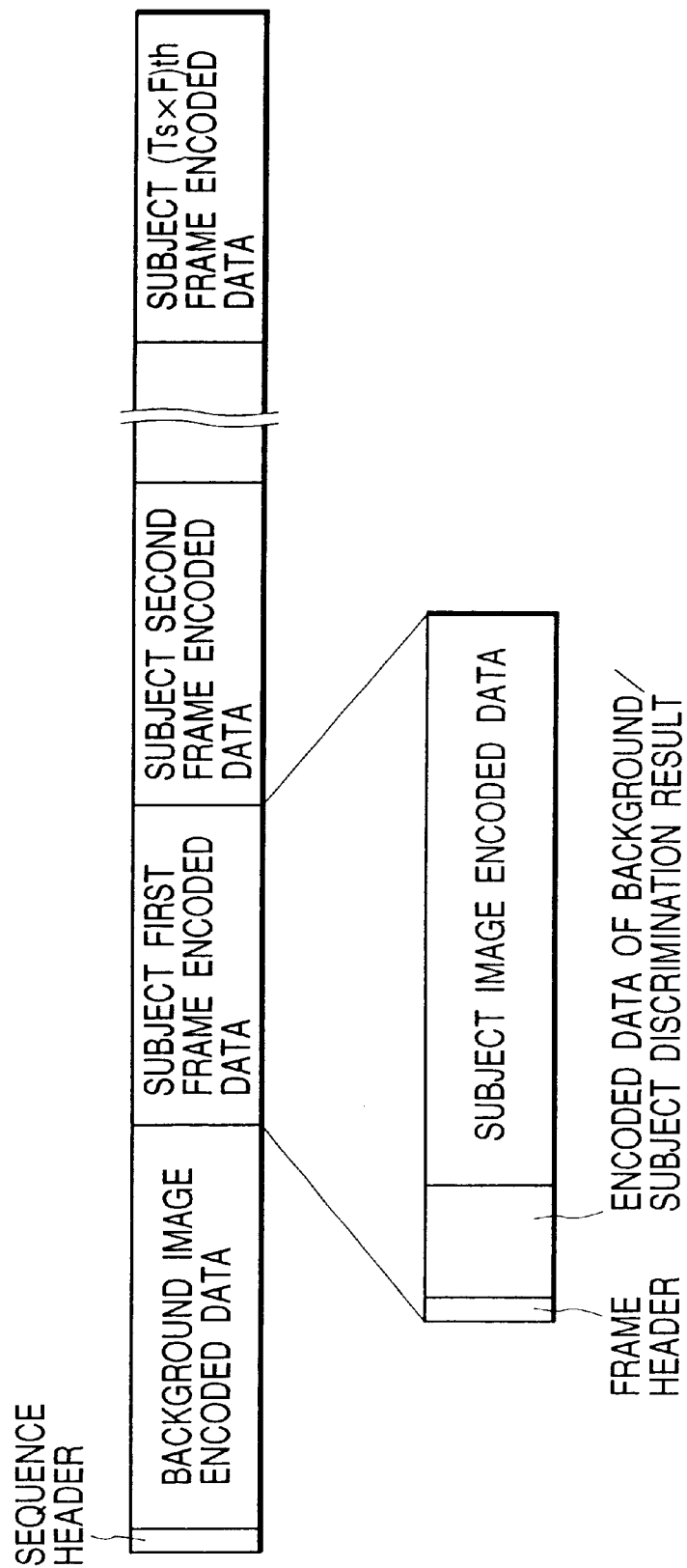

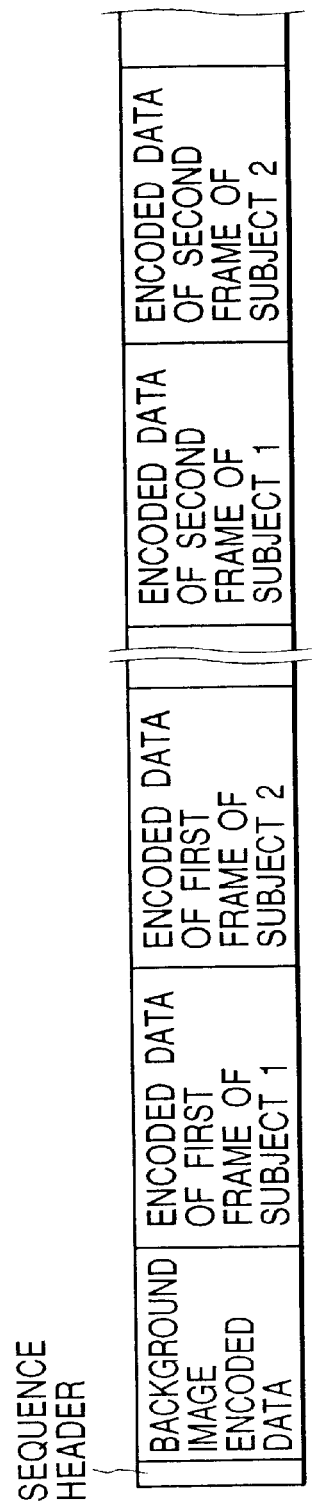

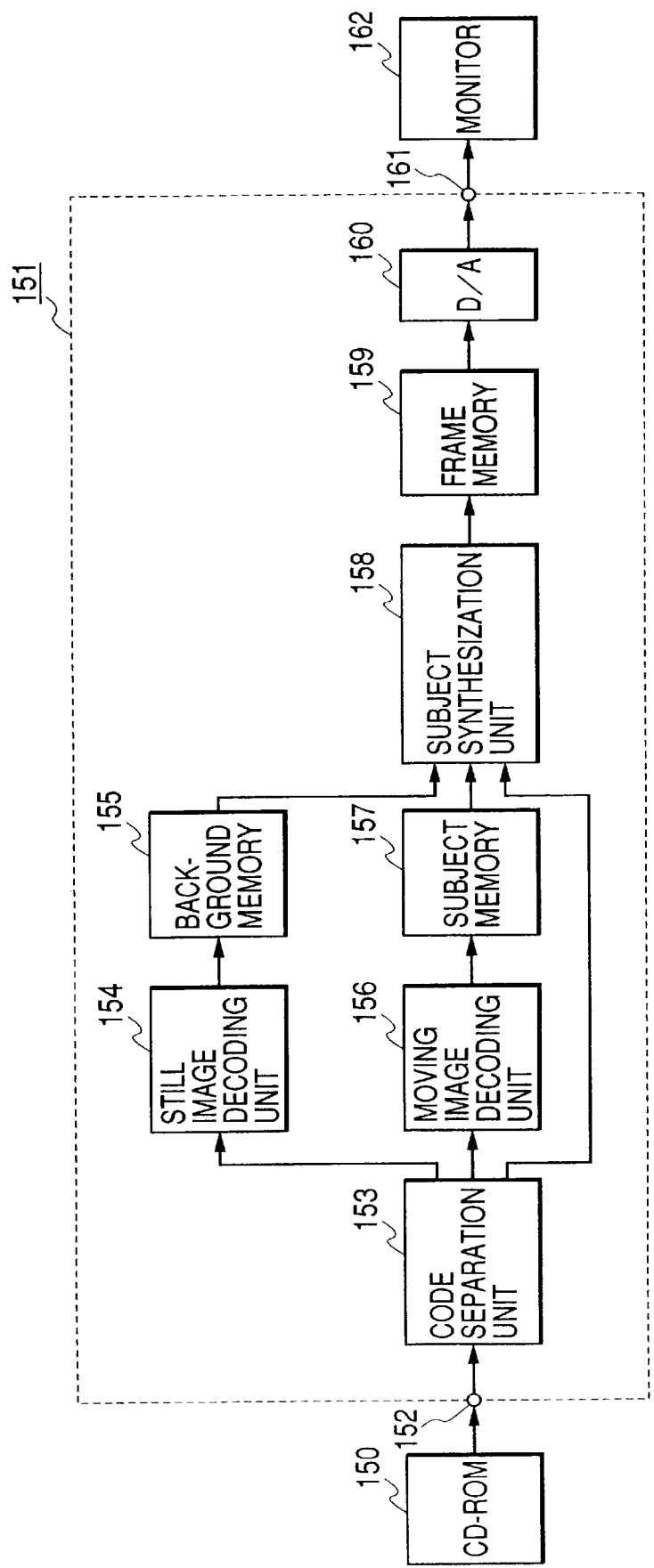

IMAGE DATA ENCODING AND DECODING USING PLURAL DIFFERENT ENCODING CIRCUITS

BACKGROUND OF THE INVENTION

1. Field of the Invention

The present invention relates to an image processing apparatus and method of efficiently encoding image data and decoding the encoded data.

2. Related Background Art

H.261, MPEG-1, and MPEG-2 are conventionally known as moving image coding schemes and internationally standardized by ITU (International Telecommunication Union) or ISO (International Organization for Standardization). These H.261, MPEG-1, and MPEG-2 are put in writing as H.264 recommendations, ISO11172, and ISO13818, respectively. Motion JPEG (Joint Photographic Coding Experts Group) coding is also known which encodes each frame by adapting still image coding (e.g., JPEG coding) to the frame.

An encoding system which encodes a video signal by MPEG-1 will be described below with reference to FIG. 1.

Referring to FIG. 1, a video signal supplied from a TV camera 1001 is input from an input terminal 1003 to a moving image encoding apparatus 1002.

An A/D converter 1004 converts the input video signal from the input terminal 1003 into a digital signal and inputs the signal to a block forming unit 1005.

The block forming unit 1005 forms a macro block composed of 16×16 pixels sequentially from the upper left pixel to the lower right pixel.

MPEG-1 can encode image data by three encoding modes: an I-frame mode (to be referred to as an I-frame hereinafter) for performing intra-frame encoding, a P-frame mode (to be referred to as a P-frame hereinafter) for performing inter-frame encoding from past frames, and a B-frame mode (to be referred to as a B-frame hereinafter) for performing inter-frame encoding from past and future frames.

A frame mode unit 1017 selects one of these three frame modes. A frame mode is determined by taking account of the bit rate of encoding, prevention of image quality deterioration caused by accumulation of operation errors in DCT (Discrete Cosine Transform), image editing, and scene changes.

A process of encoding an I-frame will be described first.

For an I-frame, a motion compensator 1006 does not operate and outputs "0". A subtracter 1007 subtracts the output from the motion compensator 1006 from the output from the block forming unit 1005 and supplies the difference to a DCT unit 1008.

The DCT unit 1008 performs DCT for the difference data supplied from the subtracter 1007 in units of blocks of 8×8 pixels and supplies the transformed data to a quantizer 1009.

The quantizer 1009 quantizes the transformed data from the DCT unit 1008 and supplies the quantized data to an encoder 1010.

The encoder 1010 one-dimensionally rearranges the quantized data from the quantizer 1009, determines codes by the 0-run length and value, and supplies the encoded data to an output terminal 1011.

The quantized data from the quantizer 1009 is also supplied to an inverse quantizer 1012. The inverse quantizer 1012 inversely quantizes the supplied quantized data and supplies the inversely quantized data to an inverse DCT unit 1013. The inverse DCT unit 1013 performs inverse DCT for the inversely quantized data and supplies the inversely transformed data to an adder 1014. The adder 1014 adds the output "0" from the motion compensator 1006 and the output from the inverse DCT unit 1013 and stores the sum in a frame memory 1015 or 1016.

A process of encoding a P-frame will be described next.

For a P-frame, the motion compensator 1006 operates, and an output from the block forming unit 1005 is input to the motion compensator 1006. An image of a temporally immediately preceding frame is also input to the motion compensator 1006 from the frame memory 1015 or 1016. The motion compensator 1006 performs motion compensation by using the input image data and outputs a motion vector and a predictive macro block.

The subtracter 1007 calculates the difference between the output from the block forming unit 1005 and the predictive macro block. This difference is subjected to DCT and quantization. The encoder 1010 determines codes on the basis of the quantized data and the motion vector and outputs the codes from the terminal 1011.

The quantized data from the quantizer 1009 is also supplied to the inverse quantizer 1012. The inverse quantizer 1012 inversely quantizes the supplied quantized data and supplies the inversely quantized data to the inverse DCT unit 1013. The inverse DCT unit 1013 performs inverse DCT for the inversely quantized data and supplies the inversely transformed data to the adder 1014. The adder 1014 adds the output from the inverse DCT unit 1013 and the output predictive macro block data from the motion compensator and stores the sum in a frame memory 1015 or 1016.

A process of encoding a B-frame is as follows.

Although motion compensation is performed for this B-frame as for a P-frame, the motion compensator 1006 performs this motion compensation by using data from both the frame memories 1015 and 1016, and forms and encodes a predictive macro block.

In the methods by which an entire image is encoded as described above, however, a background image with no motion must be repeatedly transmitted, and this wastes the code length. For example, in images in a video telephone system or video conference, only objects actually moving are persons, and the background remains stationary. In an I-frame which is transmitted for each fixed time, a background image with no motion is also transmitted to produce useless codes (code data of the background image).

FIG. 2 shows an image in a video conference or the like.

Referring to FIG. 2, a person 1050 faces a television camera in a video conference room. This person 1050 and a background 1051 are encoded in the same frame by the same encoding method.

Since the background 1051 remains still, almost no codes are produced if motion compensation is performed, but a large number of codes are produced in an I-frame.

Consequently, even for a portion with no motion, large encoded data is repeatedly and uselessly transmitted. Also, if the motion of the person 1050 is large and a large number of codes are generated by encoding, no enough code amount can be obtained by an I-frame encoding process performed after that. If this is the case, a quantization coefficient must be set for coarse quantization, and this undesirably deteriorates even the image quality of the background with no motion. Note that a moving object like the person 1050 described above will be called a subject hereinafter.

SUMMARY OF THE INVENTION

The present invention has been made in consideration of the above situation, and has as its object to provide an image processing apparatus and method of efficiently encoding input image data and decoding the encoded data.

To achieve the above object, according to one preferred aspect of the present invention, in an image processing apparatus and method, a plurality of objects are separated from input moving image data, a separated first object is encoded by a first encoding method, a separated second object is encoded by a second encoding method, and the encoding process for the second object is controlled in accordance with encoded data of the first object.

According to another preferred aspect of the present invention, in an image processing apparatus and method, a plurality of objects are separated from input moving image data, a separated first object is encoded by a first encoding method, a separated second object is encoded by a second encoding method, and the encoding process for the second object is controlled in accordance with a recording capacity of a recording medium for recording encoded data of the first object and encoded data of the second object.

According to still another preferred aspect of the present invention, in an image processing apparatus and method, a plurality of objects are separated from input moving image data, a separated first object is encoded by a first encoding method, a separated second object is encoded by a second encoding method, and the encoding process for the second object is controlled in accordance with a communication data rate at which encoded data of the first object and encoded data of the second object are communicated to an external apparatus.

According to still another preferred aspect of the present invention, in an image decoding apparatus and method of decoding synthetic encoded data obtained by separating first and second objects from input moving image data, encoding the first object by a first encoding method, encoding the second object by a second encoding method while a code amount of encoded data of the second object is controlled in accordance with encoded data of the first object, synthesizing the encoded data of the first object and the encoded data of the second object, and transmitting synthetic data, the synthetic encoded data is separated into the encoded data of the first object and the encoded data of the second object, the encoded data of the separated first object is decoded, and the encoded data of the separated second object is decoded.

According to still another preferred aspect of the present invention, there is provided an image decoding apparatus and method of decoding synthetic encoded data obtained by separating first and second objects from input moving image data, encoding the first object by a first encoding method, encoding the second object by a second encoding method while a code amount of encoded data of the second object is controlled in accordance with a communication rate, synthesizing encoded data of the first object and the encoded data of the second object, and communicating synthetic data, the synthetic encoded data is separated into the encoded data of the first object and the encoded data of the second object, the encoded data of the separated first object is decoded, and the encoded data of the separated second object is decoded.

According to still another preferred aspect of the present invention, in an image decoding apparatus and method of decoding synthetic encoded data obtained by separating first and second objects from input moving image data, encoding the first object by a first encoding method, encoding the second object by a second encoding method while a code amount of encoded data of the second object is controlled in accordance with a frame rate of the moving image data, synthesizing encoded data of the first object and the encoded data of the second object, and communicating synthetic data, the synthetic encoded data is separated into the encoded data of the first object and the encoded data of the second object, the encoded data of the separated first object is decoded, and the encoded data of the separated second object is decoded.

Other objects, features and advantages of the invention will become apparent from the following detailed description taken in conjunction with the accompanying drawings.

BRIEF DESCRIPTION OF THE DRAWINGS

FIG. 9 is a view showing one example of the format of encoded data in the first embodiment;

FIG. 10 is a view showing another example of the format of encoded data in the first embodiment;

FIG. 11 is a block diagram showing the arrangement of a moving image decoding apparatus according to the first embodiment;

DETAILED DESCRIPTION OF THE PREFERRED EMBODIMENTS

Preferred embodiments of the present invention will be described in detail below with reference to the accompanying drawings.

Figure 3:
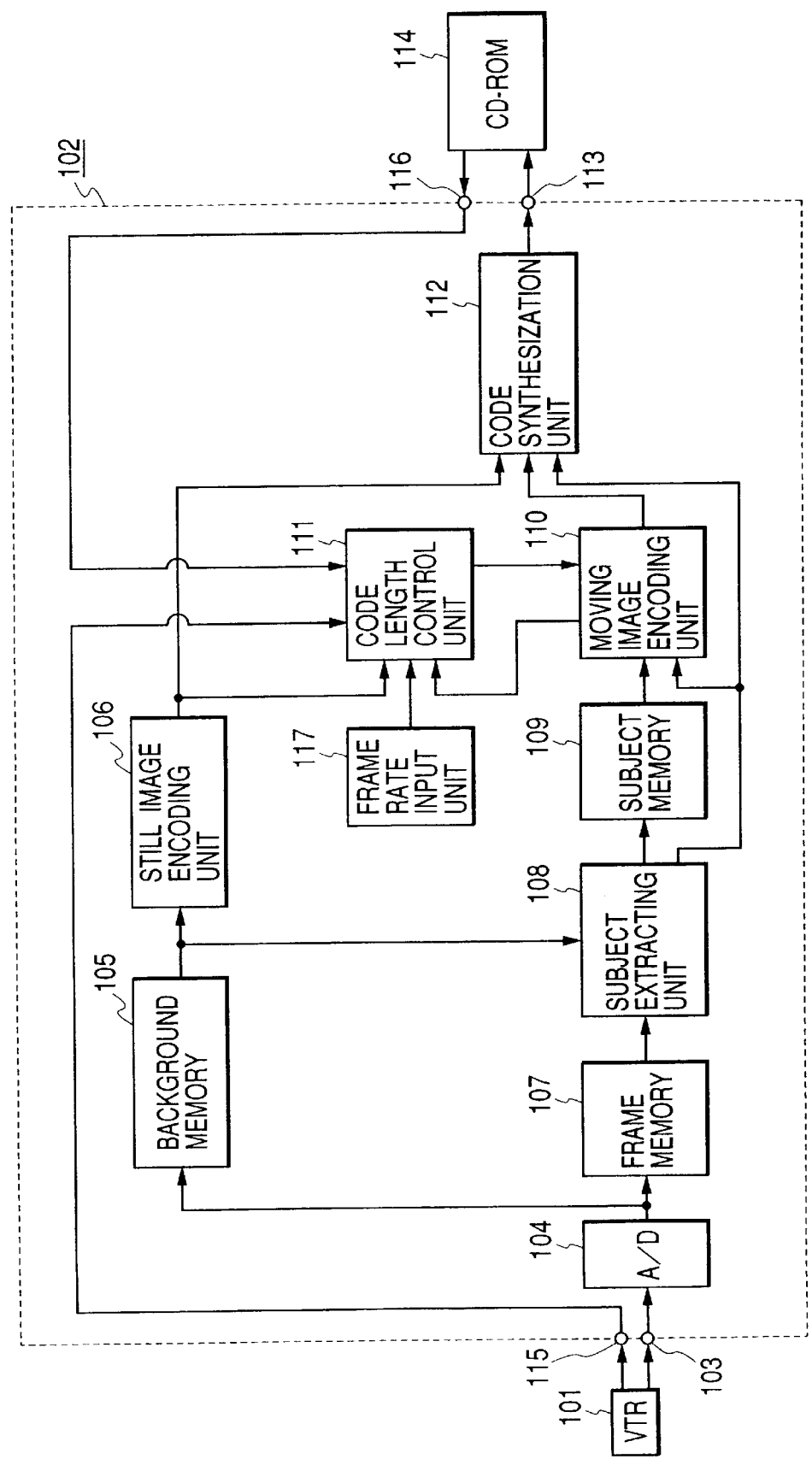
FIG. 3 is a block diagram showing the arrangement of a moving image encoding apparatus according to the first embodiment of the present invention.

FIG. 3 is a block diagram showing the arrangement of a moving image encoding apparatus according to the first embodiment of the present invention. In this embodiment, a system which uses a VTR as a moving image input means and writes encoded data on a CD-ROM will be described.

Referring to FIG. 3, a video tape recorder (VTR) 101 stores moving image sequences. This VTR 101 is a moving image input means and can also be another moving image input means such as a TV camera or a storage medium.

A moving image encoding apparatus 102 characterizes the present invention. An input terminal 103 inputs an output analog moving image signal from the VTR. An A/D converter 104 converts the analog image signal into a digital image signal. A background memory 105 stores a background image.

A still image encoding unit 106 encodes the background image by using a still image coding scheme. In this embodiment, the encoding scheme used in the still image encoding unit 106 is the JPEG coding scheme. However, the encoding scheme used in the still image encoding unit 106 is not particularly limited, so it is possible to use some other still image coding scheme, e.g., Wavelet coding, DPCM coding, or vector quantization. Also, the I-frame mode image coding scheme is naturally usable.

A frame memory 107 stores image data of one frame. A subject extracting unit 108 extracts a subject to be encoded from the background memory 105 and the frame memory 107. A subject memory 109 stores the extracted subject. A moving image encoding unit 110 encodes the extracted subject without using any motion compensation. A code length control unit 111 receives the code lengths of codes generated by the still image encoding unit 106 and the moving image encoding unit 110 and controls the generated code lengths. A code synthesization unit 112 synthesizes the encoded data generated by the still image encoding unit 106 and the moving image encoding unit 110 and generates one encoded data. An output terminal 113 outputs the encoded data generated by the code synthesization unit 112. A CD-ROM writer 114 records the encoded data in a CD-ROM. A terminal 115 inputs information such as the length of moving image sequence stored in the VTR 101. A terminal 116 inputs information such as the storage capacity of CD-ROM. A frame rate input unit 117 inputs a frame rate desired by a user.

The operation of the apparatus constructed as above will be described below.

First, assume that a frame containing no subject image is stored in the head of a moving image sequence in the VTR 101.

The VTR 101 inputs a length (time) Ts of a moving image sequence to be encoded to the code length control unit 111 via the input terminal 115. Also, the CD-ROM writer 114 inputs a free capacity Cc of CD-ROM. This free capacity Cc is the target code length in encoding.

Figure 4:
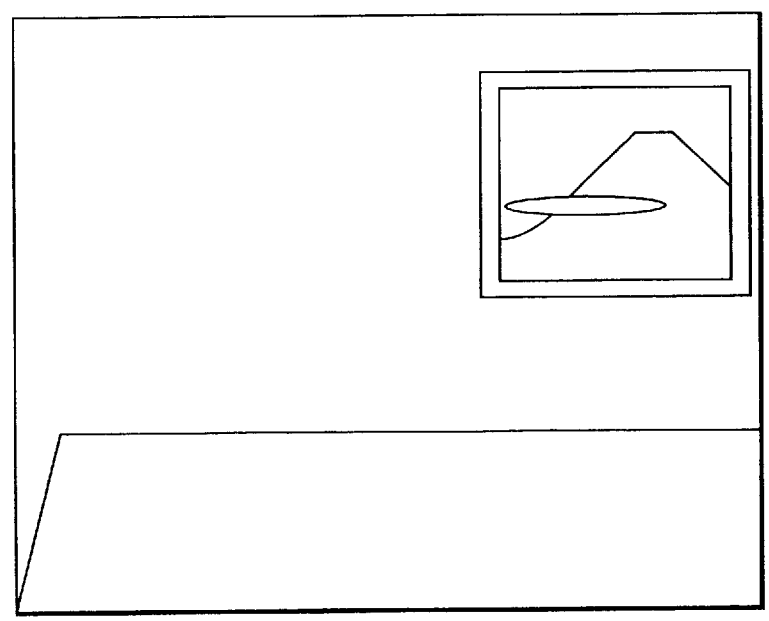
FIG. 4 is a view showing a background image in the first embodiment.

Next, the VTR 101 inputs image data of a frame containing no subject image (i.e., image data of only a background image) via the input terminal 103. The A/D converter 104 converts the input image data into a digital signal and stores the signal in the background memory 105. Assume that an image shown in FIG. 4 is the background image of an image shown in FIG. 2. This image is stored in the background memory 105.

When the background image is input to the background memory 105, the still image encoding unit 106 encodes this background image in relatively fine quantization steps by using the JPEG coding system and supplies the encoded data to the code synthesization unit 112. The still image encoding unit 106 also supplies a code length Lb generated by this encoding to the code length control unit 111. On the basis of the length Ts of the moving image sequence, the free capacity Cc, and the code length Lb of the background image, the code length control unit 111 calculates an encoding rate Ro of the moving image sequence by $$Ro=(Cc-Lb)/Ts/F \quad (1)$$

where a variable F is an input moving image frame rate from the frame rate input unit 117. That is, the frame rate input unit 117 can change the frame rate. Hence, the encoding rate Ro represents a code length consumable in one frame.

The VTR 101 then time-sequentially inputs image data of a frame containing a subject. The A/D converter 104 converts the input analog signal from the input terminal 103 into a digital signal and supplies the signal to the frame memory 107. When this image data of one frame is stored in the frame memory 107, the subject extracting unit 108 extracts the subject from the image data stored in the frame memory 107 and the background memory 105. That is, the subject extracting unit 108 separates different kinds of objects (a background and a person) contained in the image.

The following method is possible as one subject extraction method. For example, the image data stored in the frame memory 107 and the background memory 108 are read out in synchronism with each other, and pixel differences between these image data are calculated. Pixels having pixel differences of a threshold value or less are considered to be contained in a background, and other pixels are regarded as being contained in a subject. When threshold comparison for one frame is complete, pixels contained as a group in a plurality of subjects are regarded as subject candidates. If subject extraction is previously performed, these subject candidates are compared with image data of each subject stored in the subject memory 109, and a subject candidate with the highest similarity is regarded as the same subject. This similarity can be determined by taking account of, e.g., the position, size, density (luminance), and average of subject. If it is also possible to detect a motion vector by using a block composed of a plurality of pixels and determine that masses whose motion vectors move in the same way represent the same object.

Figure 5:
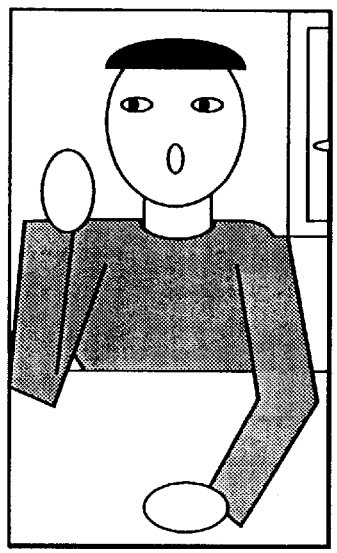
FIG. 5 is a view showing a subject image in the first embodiment.
Figure 6:
FIG. 6 is a view showing a background/subject discrimination result in the first embodiment.

When a subject is specified, pieces of information such as the position and size of the subject are encoded, and the encoded data is supplied to the code synthesization unit 112. The subject memory 109 stores image data of the extracted subject, which is cut out into the form of a rectangle, and a threshold comparison result (to be referred to as a background/subject discrimination result hereinafter) representing background pixels/subject pixels in the position of the image data. For the image shown in FIG. 2, a rectangle containing a subject shown in FIG. 5 is cut out and stored together with a background/subject discrimination result shown in FIG. 6. These pieces of information are supplied to the moving image encoding unit 110.

Figure 7:
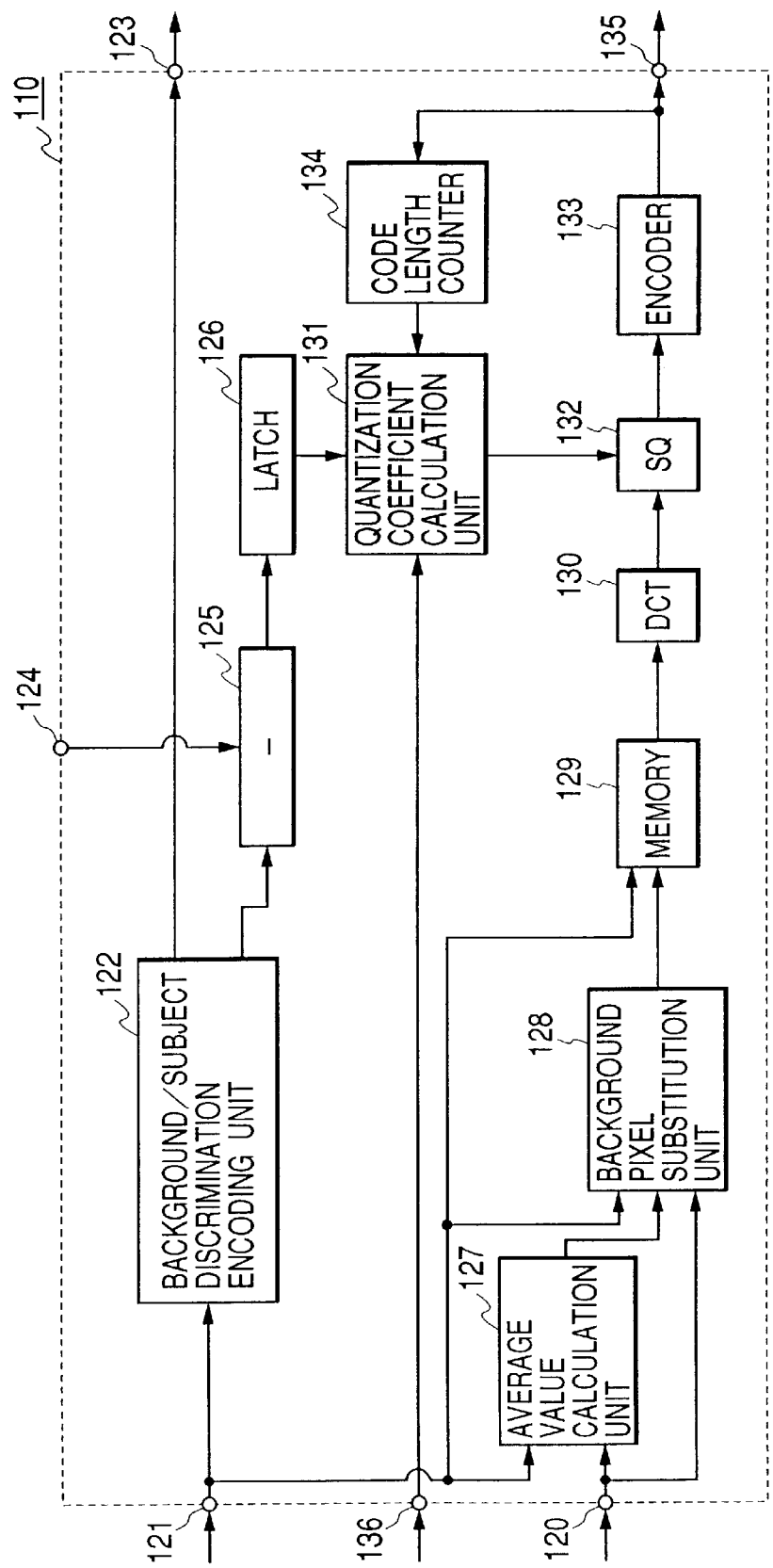
FIG. 7 is a block diagram showing the arrangement of a moving image encoding unit 110 in the first embodiment.

FIG. 7 is a block diagram showing the arrangement of the moving image encoding unit 110. For the sake of simplicity of explanation, this moving image encoding unit 110 will be described by taking an encoding scheme which performs fixed-length encoding in units of frames as an example.

Referring to FIG. 7, a terminal 120 inputs the rectangular image data of a subject to be encoded from the subject memory 109 shown in FIG. 3. A terminal 121 inputs the background/subject discrimination result of the data. A background/subject discrimination encoding unit 122 encodes the input background/subject discrimination result.

This encoding scheme is, e.g., the JBIG (Joint Bi-level Image Coding Experts Group) coding scheme as binary coding. Also, the MMR (Modified MR (Modified Read)) encoding scheme or similar encoding can be used with no problem.

A terminal 123 outputs the encoded data generated by the background/subject discrimination encoding unit 122 to an external apparatus. This terminal 123 is connected to the encoding synthesization unit 112. A terminal 124 inputs the target value Ro of the code length of each frame. This terminal 124 is connected to the code length control unit 111.

A subtracter 125 subtracts a code length Lo generated by the background/subject discrimination encoding unit 122 from the target value Ro. A latch 126 stores the output value from the subtracter 125. An average value calculation unit 127 calculates an average value m of the subject image data. A background pixel substitution unit 128 substitutes the values of pixels representing the background in the cut rectangle with the average value m. A memory 129 stores the output data from the background pixel substitution unit 128. A DCT unit 130 divides the memory 129 into blocks and performs DCT.

A quantizer 132 quantizes the output from the DCT unit 130 in accordance with a quantization value calculated by a quantization coefficient calculation unit 131. This quantization is similar to that used in JPEG or MPEG coding; quantization is performed by multiplying a quantization matrix corresponding to a DCT coefficient by a quantization coefficient Q.

An encoder 133 one-dimensionally arranges the quantization results, assigns codes to the 0-run length and value, and calculates the code length. A terminal 135 finally outputs the generated encoded data. A code length counter 134 counts the calculated code length. A terminal 136 inputs subject size information from the subject extracting unit 108.

The operation of the moving image encoding unit 110 constructed as above will be described below.

Prior to encoding image data of a subject in a certain frame, the background/subject discrimination encoding unit 122 performs JBIG encoding for an input background/subject discrimination result from the terminal 121. The obtained encoded data is supplied to the code synthesization unit 112 via the terminal 123.

Also, the code length Lo of the encoded data from the background/subject discrimination encoding unit 122 is input to the subtracter 125 where a difference Oo from the target value Ro is calculated. This difference Oo is held in the latch 126.

The code length counter 134 resets its contents Lt to 0. On the basis of the size of rectangle of the subject image and the difference Oo as the target value of the code length of the rectangle, the quantization coefficient calculation unit 131 determines an initial value of the quantization coefficient Q of the quantizer 132. This coefficient can be determined to a certain degree from past experiments; as the size of rectangle increases, the quantization coefficient tends to increase to maintain the same code length. Therefore, the initial value is calculated by taking this tendency into consideration.

The subject image data and the background/subject discrimination result are input in synchronism with each other from the terminals 120 and 121, respectively. The average value calculation unit 127 adds input pixels whose background/subject discrimination result indicates a subject pixel, and increases the number N of the subject pixels. This processing is not performed for background pixels.

When discrimination, addition, and count-up are completely performed for the whole subject image data, the sum is divided by the number N of the subject pixels to obtain the average value m of the subject. Subsequently, the background pixel substitution unit 128 loads the subject image data and the background/subject discrimination result in synchronism with each other. If the background/subject discrimination result of each input pixel indicates a background pixel, the background pixel substitution unit 128 outputs the average value m; if not, the unit 128 directly outputs the input pixel value. This output is stored in the memory 129.

After all pixels in the subject rectangle are processed and the results are stored in the memory 129, the image is read out in units of blocks from the memory 129. In synchronism with this image read, the background/subject discrimination result is read out. The DCT unit 130 performs DCT only for blocks containing subject pixels, and the quantizer 132 quantizes the coefficient by a quantization coefficient based on the quantization coefficient Q. The encoder 133 assigns a code to the quantization result, and the code length counter 134 adds the code length to Lt.

Figure 8:
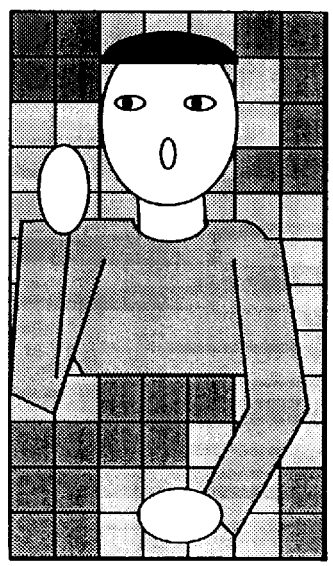
FIG. 8 is a view for explaining the encoded state of the subject in the first embodiment.

FIG. 8 shows the above processing. Referring to FIG. 8, dark halftone blocks are not encoded, and only blocks containing the subject are encoded. Background pixels contained in these subject blocks are substituted with the average value m (light halftone portions in FIG. 8). When all pixels in the subject rectangle are encoded, the quantization coefficient calculation unit 131 compares the contents of the latch 126 with the contents Lt of the code length counter 134 and calculates a new quantization coefficient Q' by $$\text{If} \quad (Lt < Oo) Q' = Q - 1 \quad (2)$$
$$\text{Else if} \quad (Lt > Oo) Q' = Q + 1$$
$$\text{Else} \quad Q' = Q$$

If Q' is equal to Q, the quantization coefficient Q' is an optimum quantization coefficient. So, the blocks to be encoded are sequentially read out from the memory 129 and subjected to DCT, and the quantizer 132 quantizes the transformed data by the quantization coefficient Q'. The encoder 133 encodes the quantized data, and the encoded data is output from the terminal 135. This quantization coefficient Q' is held for each subject because this coefficient Q' is an initial value of the quantization coefficient Q for the next encoded frame. If Q' is unequal to Q, Q' is compared with a past quantization coefficient Qo. If Q' is equal to Qo, the quantization coefficient Q' is considered to be an optimum quantization coefficient. Hence, as in the above processing, the subject image is encoded and output from the terminal 135, and the quantization coefficient Q' is held. If Q' is unequal to Qo, the quantization coefficient Q is held as the past quantization coefficient Qo. The above processing is repeated until an optimum quantization coefficient is obtained.

The data encoded by the moving image encoding unit 110 by the operation as described above is input to the code synthesization unit 112. The code synthesization unit 112 synthesizes the encoded data generated by the individual units and generates one encoded data.

Figure 1:
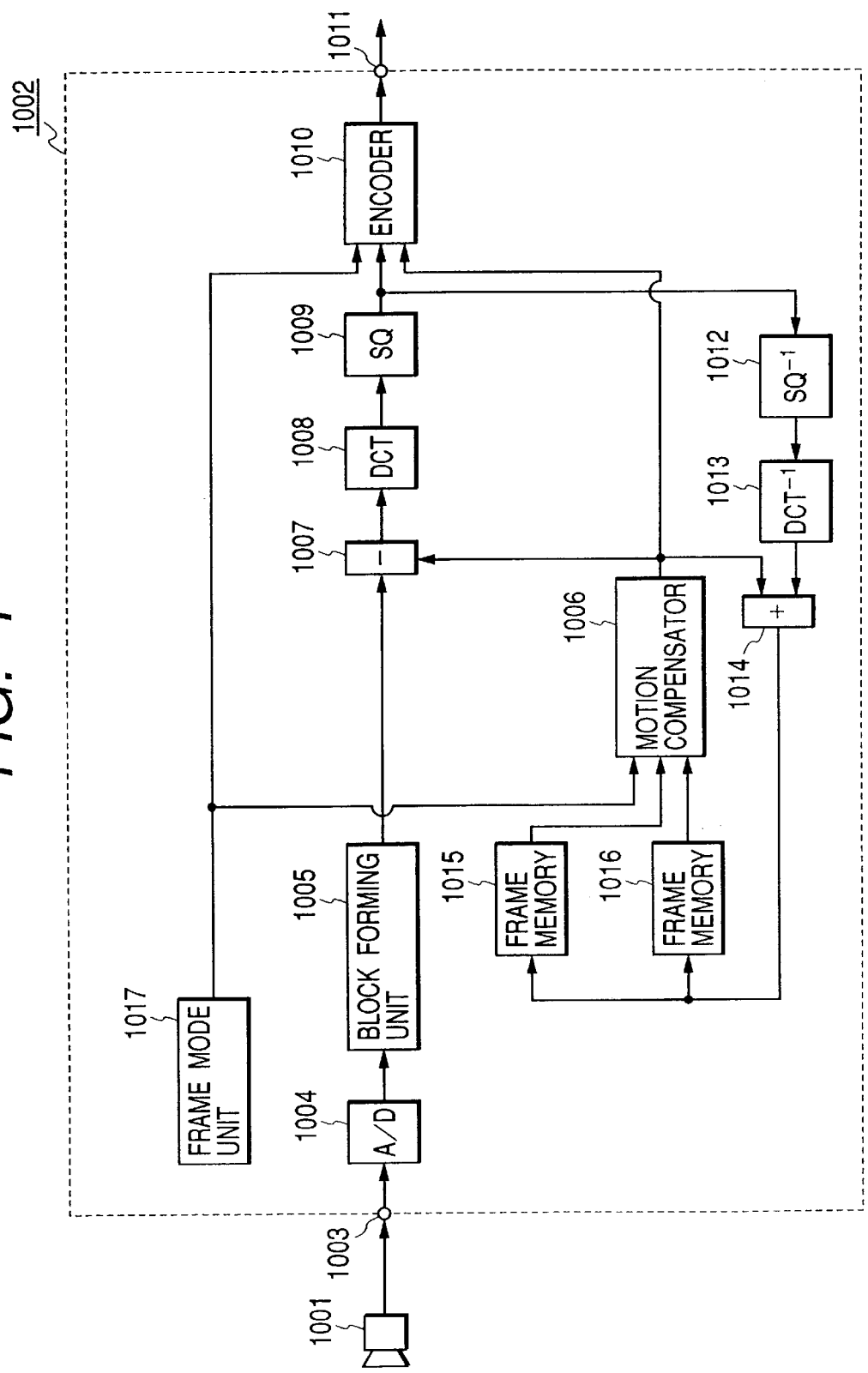
FIG. 1 is a block diagram showing the arrangement of a conventional moving image encoding apparatus.
Figure 2:
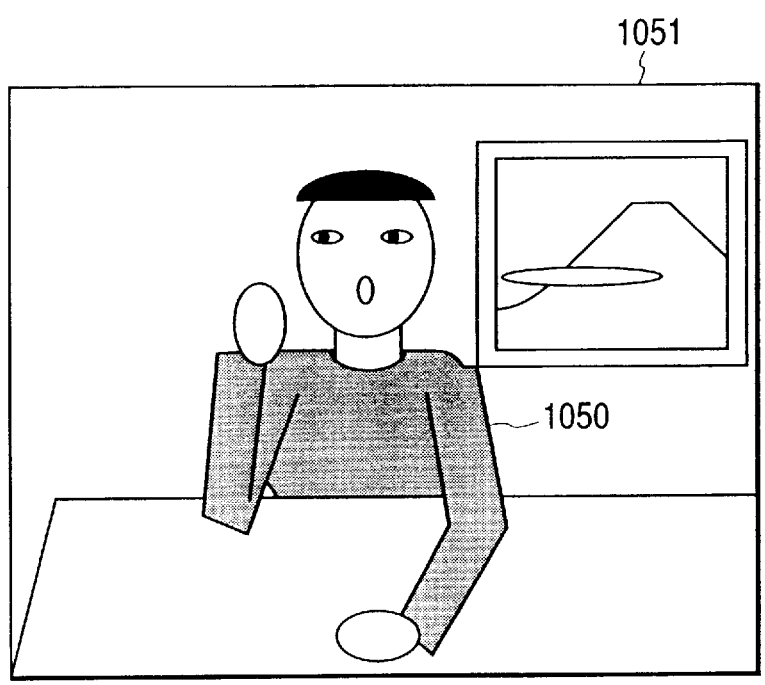
FIG. 2 is a view showing an image to be encoded.

FIG. 9 shows one example of the encoded data output from the code synthesization unit 112 for the image shown in FIG. 2. Since the image shown in FIG. 2 contains one subject, the code synthesization unit 112 adds a sequence header, indicating that the number of subjects is one, to the head of the encoded data. An area of the output background image encoded data from the still image encoding unit 106 follows this sequence header. Encoded data areas for individual frames of the subject follow the background image encoded data area. In this embodiment, encoded data from the first frame to the (Ts×F)th frame of the person 1050 are contained.

A frame header is stored in the head of each frame encoded data. This frame header contains the encoded data output from the subject extracting unit 108 and indicating the size of the subject and the encoded data indicating the position of the subject in the background image. Data stored following this frame header is the encoded data of the background/subject discrimination result generated by the background/subject discrimination encoding unit 122 of the moving image encoding unit 110 shown in FIG. 7. Finally, the encoded data of the subject image generated by the encoder 133 shown in FIG. 7 is stored. The generated encoded data is output from the terminal 113 and written on a CD-ROM by the CD-ROM writer 114.

If a plurality of subjects exist, the target value Ro is distributed to these subjects when the subjects are encoded. The target value Ro can be distributed in accordance with the ratio of sizes (e.g., the numbers of pixels or the sizes of rectangles) of the subjects. As shown in FIG. 10, the number of objects contained in a sequence is written in the sequence header. Following the background image, image encoded data of a plurality of extracted subjects (subject 1, subject 2, . . . ) are stored in units of frames. That is, encoded data of a first frame of subject 1 immediately follows the background image encoded data, encoded data of a first frame of subject 2 follows the encoded data of the first frame of subject 1, and so on. When encoded data of first frames of all subjects are stored, encoded data of a second frame of subject 1, encoded data of a second frame of subject 2, . . . , are stored.

FIG. 11 shows the arrangement of a system which decodes the encoded data generated by the first embodiment and displays the decoded data on a monitor.

Referring to FIG. 11, a CD-ROM reader 150 for reading out the encoded data written in a CD-ROM by the CD-ROM writer 114 is connected to a moving image decoding apparatus 151.

A terminal 152 loads the encoded data. A code separation unit 153 separates individual codes from the encoded data. A still image decoding unit 154 decodes image data of a background image. A background memory 155 stores the decoded background image. A moving image decoding unit 156 decodes encoded data of each subject. A subject memory 157 stores the decoded subject image data. A subject synthesization unit 158 synthesizes each subject image data in a corresponding position of the contents of the background memory 155 to finally obtain a decoded image. A frame memory 159 stores the image generated by the subject synthesization unit 158. A D/A converter 160 converts the digital image signal from the frame memory 159 into an analog image signal. A terminal 161 outputs the analog image signal to an external apparatus. A monitor 162 displays the output analog image signal.

The operation of the apparatus constructed as above will be described below.

The CD-ROM reader 150 sequentially reads out encoded data from the beginning and supplies the readout data to the moving image decoding apparatus 151 via the terminal 152. The code separation unit 153 interprets each header of the input encoded data from the terminal 152, separates individual codes, and outputs the separated codes to the subsequent stage. More specifically, the code separation unit 153 first receives the sequence header to detect the number of objects and initializes the moving image decoding unit 156, the subject memory 157, and the subject synthesization unit 158.

Subsequently, the code separation unit 153 receives the background image encoded data and supplies the data to the still image decoding unit 154. The still image decoding unit 154 decodes the input background image encoded data in accordance with the decoding procedure of the JPEG coding scheme and stores the result in the background memory 155.

After that, the code separation unit 153 receives the encoded data of each frame image of each subject. From this encoded data, the code separation unit 153 decodes the position code of each subject and supplies the decoded data of each subject in each frame to the subject synthesization unit 158. The code separation unit 153 supplies the rest of the encoded data to the moving image decoding unit 156. From the encoded data of each subject, the moving image decoding unit 156 decodes the background/subject discrimination result in accordance with the decoding procedure of the JBIG coding scheme and stores the result in the subject memory 157.

The subject image encoded data is also subjected to inverse quantization and inverse DCT and decoded into image data. The decoded image data is stored in a corresponding position of the subject memory 157 by looking up the background/subject discrimination result.

The subject synthesization unit 158 reads out the image data and background/subject discrimination results of the subjects stored in the subject memory 157 onto the image in the background memory 155. The subject synthesization unit 158 uses the pixel value of a background image for pixels whose background/subject discrimination result indicates a background pixel without using the pixel value of the subject, and uses the subject pixel value for pixels whose background/subject discrimination result indicates a subject pixel. The subject synthesization unit 158 arranges the decoded subjects in their respective corresponding positions to generate a final decoded image and stores the image in the frame memory 159. The decoded image is read out, converted into an analog image signal by the D/A converter 160, supplied to the monitor 162 via the terminal 161, and displayed.

By the series of operations as described above, the background image and the subject image are separated and individually encoded, so the encoding efficiency increases. Additionally, when the background image, the subject image, and the image data and background/subject discrimination result of the subject image are encoded, the encoding of the image data of the subject image is controlled by taking account of the code length of the background image and the code length of the background/subject discrimination result. This allows easy quantization control and makes it possible to obtain encoded data with a desired code length.

The first embodiment has been described by taking fixed-length encoding performed in units of frames by the moving image encoding unit 110 as an example. However, it is also possible to perform encoding by which the results of encoding of a plurality of frames are stored in a fixed code length, such as in the MPEG coding scheme.

Figure 12:
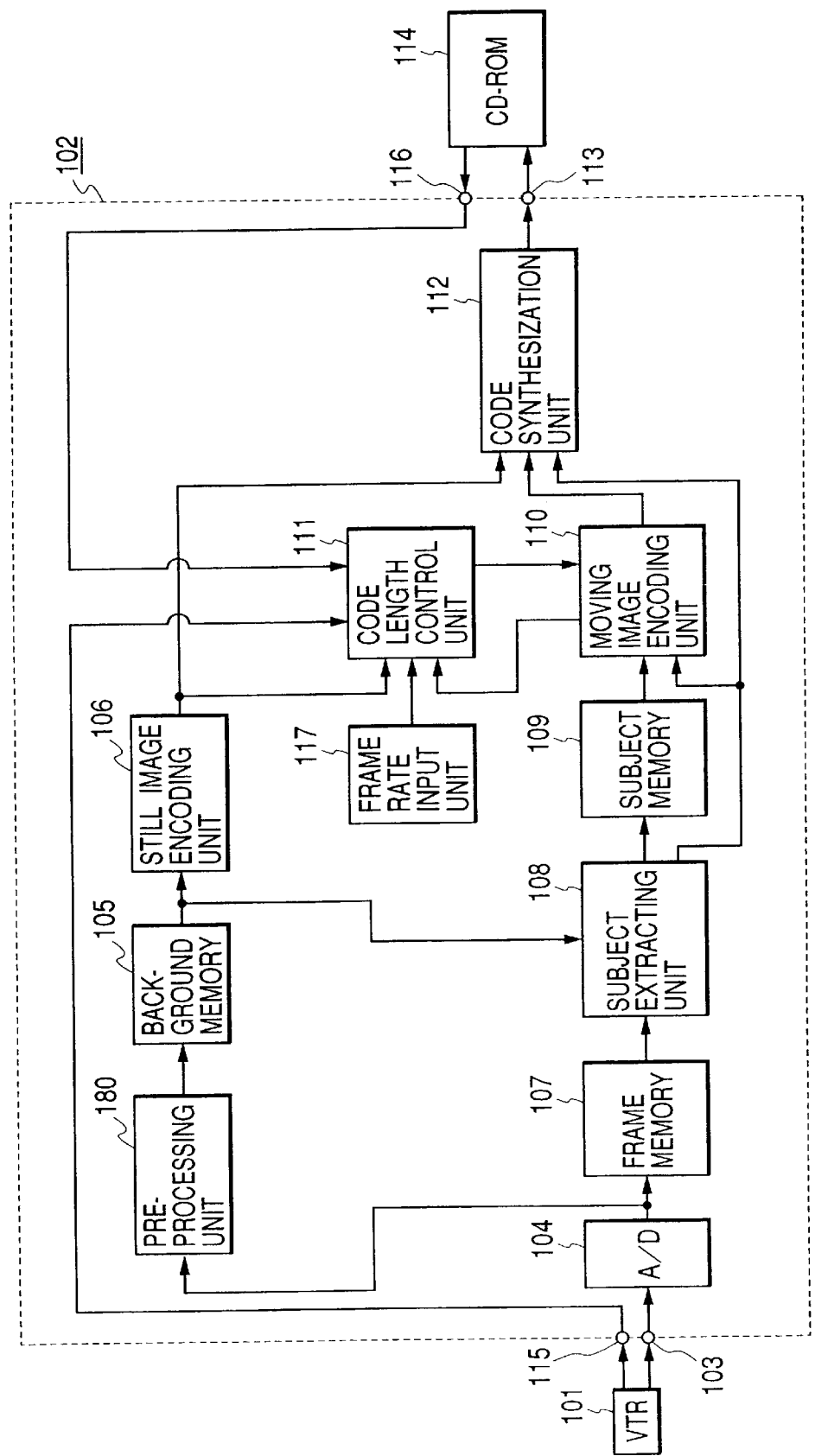
FIG. 12 is a block diagram showing the arrangement of another moving image encoding apparatus according to the first embodiment.

In the first embodiment, the leading frame is used for a background image. However, any other method can be used as long as the same effect is obtained. For example, a preprocessing means can be used as shown in FIG. 12. This preprocessing unit 180 can obtain a background image from a plurality of frames by calculating the average value of pixels and using this average value as the value of background pixel, or by extracting pixels with no motion from all frames and regarding these pixels as background pixels.

In the first embodiment, the background pixel substitution unit 128 is separately operated. However, substitution can also be performed in units of blocks containing subjects after memory read.

Figure 13:
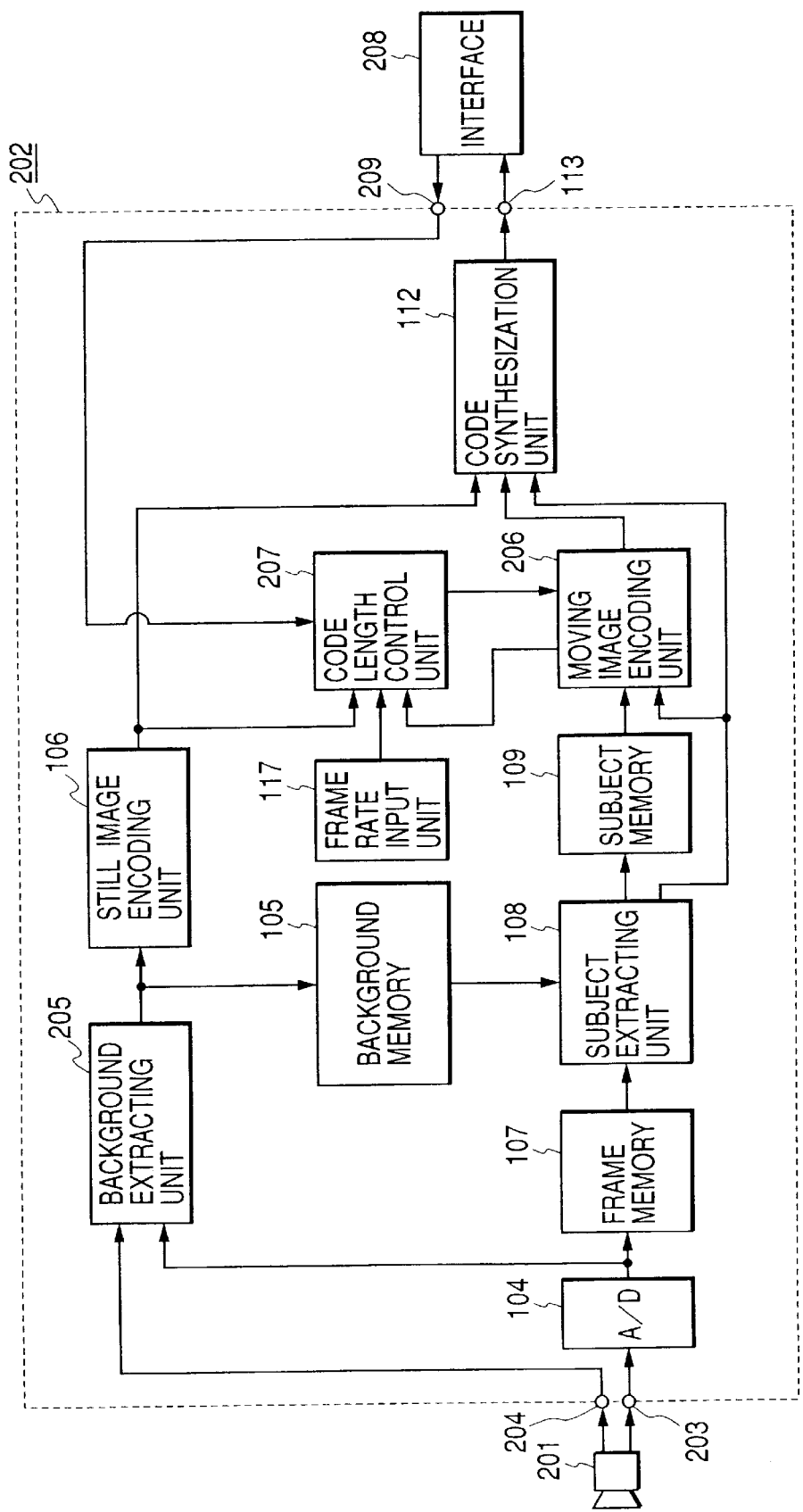
FIG. 13 is a block diagram showing the arrangement of a moving image communication apparatus according to the second embodiment of the present invention.

FIG. 13 is a block diagram showing the arrangement of a moving image communication apparatus according to the second embodiment of the present invention. The same reference numerals as in FIG. 3 denote the same parts in FIG. 13, and a detailed description thereof will be omitted.

Referring to FIG. 13, a video camera 201 for inputting moving images has a function of detecting the direction in which this camera points. This video camera 201 can be replaced with a camera which changes its direction by driving a pan head by using a motor or the like.

A moving image encoding apparatus 202 characterizing the present invention comprises terminals 203 and 204, a background extracting unit 205, a moving image encoding unit 206, a code length control unit 207, a communication interface 209, and a terminal 208. The terminal 203 inputs an analog moving image signal from the video camera 201. The terminal 204 inputs camera direction information. The moving image encoding unit 206 encodes an extracted subject by using motion compensation. The communication interface 209 connects to an external communication line. The terminal 208 inputs the capacity (transmission bit rate) of the communication line connected to the communication interface 208.

The operation of the apparatus constructed as above will be described below.

First, the video camera 201 in an initial state inputs an image containing no subject as shown in FIG. 4 to an A/D converter 104 via the terminal 203. The A/D converter 104 converts the input image into a digital signal and supplies the signal to the background extracting unit 205.

The background extracting unit 205 does not operate and immediately stores the input data in a background memory 105. When the background image is input to the background memory 105, a still image encoding unit 106 generates reversible codes with no deterioration from this background image by the JPEG-LS coding scheme and supplies the codes to a code synthesization unit 112. As in the first embodiment, any coding scheme capable of achieving the same function can be used in the still image encoding unit 106.

The code synthesization unit 112 transmits the background encoded data from the communication interface 208 to an external apparatus via the terminal 113.

A capacity No of the communication line is supplied to the code length control unit 207 via the terminal 209. This line capacity No is the target code length in encoding. On the basis of the communication line capacity No and a frame rate F, the code length control unit 207 calculates an encoding rate Rf for each frame by $$Rf = No/F \quad (3)$$

Next, the apparatus starts image encoding when a subject enters the visual field of the video camera 201. In this state, the position of a person 1050 remains stationary, and the direction of the video camera 201 is also fixed. Under the conditions the background extracting unit 205 does not operate. Meanwhile, the A/D converter 104, a frame memory 107, a subject extracting unit 108, and a subject memory 109 operate in the same manner as in the first embodiment. That is, the subject memory 109 stores image data cut out into the form of a rectangle of each subject extracted from the subject extracting unit 108 and a background/subject discrimination result in the position of the subject. The moving image encoding unit 206 performs intra-frame encoding for I-frames and inter-frame encoding for P-frames as in MPEG coding such that one I-frame and two P-frames form one encoding unit. That is, a fixed length is the length of encoded data of three frames.

Figure 14:
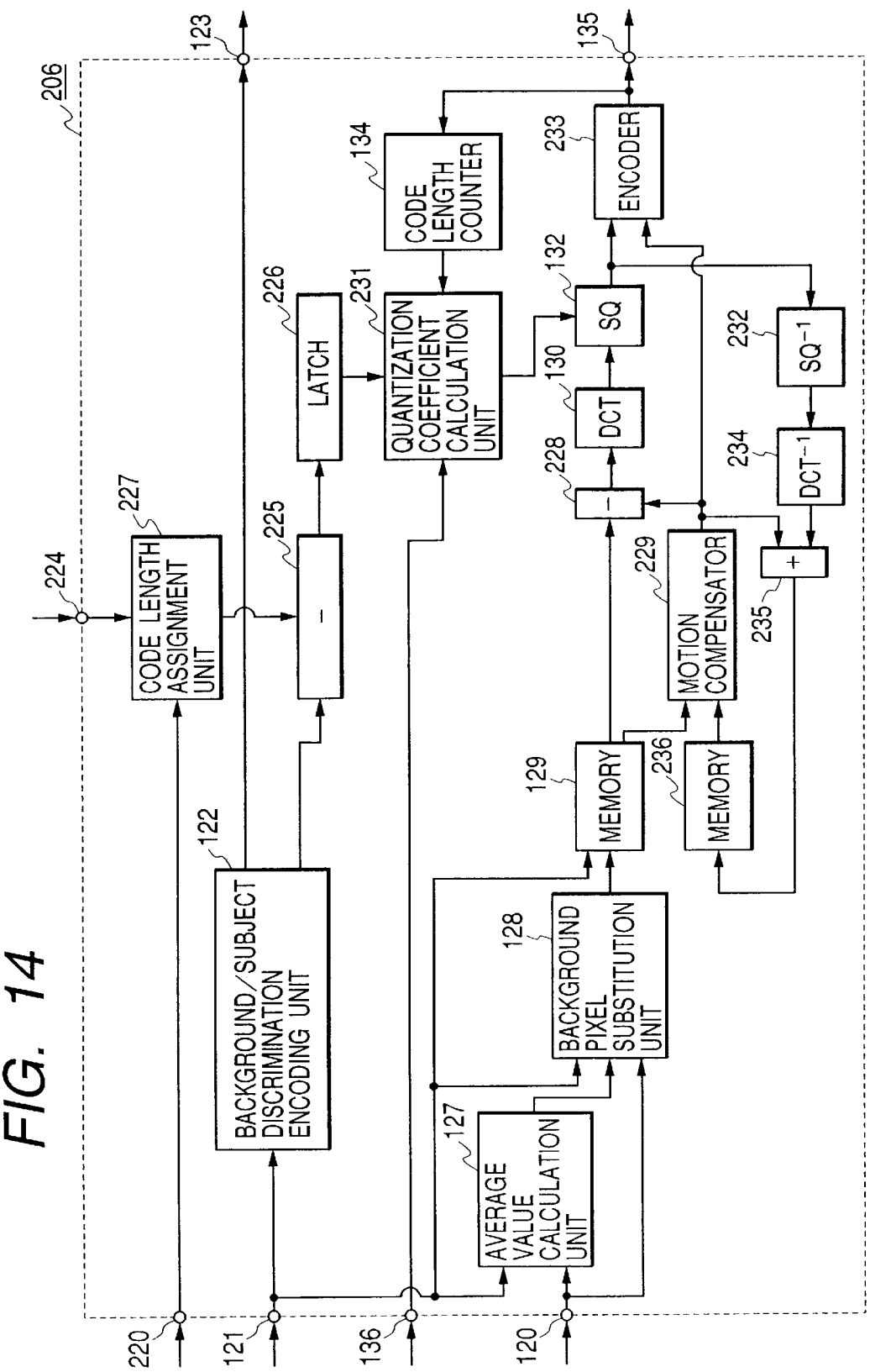
FIG. 14 is a block diagram showing the arrangement of a moving image encoding unit 206 in the second embodiment.

FIG. 14 shows the arrangement of the moving image encoding unit 206. The same reference numerals as in FIG. 5 denote the same parts in FIG. 14, and a detailed description thereof will be omitted.

Referring to FIG. 14, a terminal 220 inputs a code length Lb when the still image encoding unit 106 encodes a background. A terminal 224 inputs the target value Rf of the code length of each frame. This terminal 224 is connected to the code length control unit 207.

A code length assignment unit 227 determines the target code length of each frame. A subtracter 225 subtracts a code length Lo generated by a background/subject discrimination encoding unit 122 from the target code length of each frame. A latch 226 stores the value calculated by the subtracter 225. Another subtracter 228 is connected to a motion compensator 229. For an I-frame, this motion compensator 229 does not operate, outputs a macro block of value 0, and does not output any motion vector. For a P-frame, the motion compensator 229 operates and outputs a predictive macro block and a motion vector.

A quantization coefficient calculation unit 231 calculates a quantized value for each frame mode. An encoder 233 one-dimensionally arranges the quantization results, assigns codes to the 0-run length and value, and calculates the code length. For a P-frame, the encoder 233 also encodes a motion vector.

The moving image encoding unit 206 also includes an inverse quantizer 232 for performing inverse quantization, an inverse DCT unit 234, and a memory 236.

The operation of the moving image encoding unit 206 constructed as above will be described below.

First, the target value Rf of the code length of each frame is input from the terminal 224. From this target value Rf, the code length assignment unit 227 calculates a code length Rf×3 consumable in one encoding unit composed of three frames and thereby calculates code lengths to be assigned to an I-frame and a P-frame. For the sake of simplicity of explanation, assume that the ratio of code lengths to be assigned to an I-frame and a P-frame is I:P:P=8:1:1.

Accordingly, a target value Ro is $$Ro = Rf \times 3 \times 8/10 \quad (4)$$

for an I-frame, and is $$Ro = Rf \times 3/10 \quad (5)$$

for a P-frame.

As in the first embodiment, the background/subject discrimination encoding unit 122 performs JBIG encoding for a background/subject discrimination result and outputs the encoded data to the code synthesization unit 112 via a terminal 123. The subtracter 225 calculates a difference Oo between the target value Ro and the code length Lo. This difference Oo is held in the latch 226.

A code length counter 134 resets its contents Lt to 0. On the basis of the size of rectangle of a subject image and the difference Oo, the quantization coefficient calculation unit 231 determines an initial value of a quantization coefficient Q of a quantizer 132 for each frame mode.

For an I-frame, as in the first embodiment, an average value calculation unit 127 calculates an average value m of a subject. Of pixels of the subject, a background pixel substitution unit 128 substitutes the values of pixels, whose background/subject discrimination result indicates a background pixel, with the average value m, and stores these pixels in a memory 129. After the results are stored in the memory 129, the image is read out in units of blocks in synchronism with the background/subject discrimination results from the memory 129. Of these blocks, only blocks containing subject pixels are input to the subtracter 228. At this time, the output from the motion compensator 229 is 0, so a DCT unit 130 performs DCT in units of blocks composed of 8×8 pixels. The quantizer 132 quantizes the coefficient by a quantization coefficient based on the quantization coefficient Q. The encoder 233 assigns codes to the quantization result, and the code length counter 134 adds the code length to Lt.

The blocks to be encoded are as shown in FIG. 8. When all pixels in the subject rectangle are completely encoded, the quantization coefficient calculation unit 231 calculates a new quantization coefficient Q' in accordance with equation (2). As in the first embodiment, the quantization coefficient calculation unit 231 compares the quantization coefficient Q' with Q and continues the operation until an optimum quantization coefficient is obtained. When an optimum quantization coefficient Q is obtained, data is quantized by this quantization coefficient Q, encoded by the encoder 233, and output from the terminal 135. Simultaneously, the output from the quantizer 132 is applied to the inverse quantizer 232 where the data is inversely quantized. This data is then subjected to inverse DCT by the inverse DCT unit 234, added to the output from the motion compensator 229 by an adder 235, and stored in the memory 236.

For a P-frame, as in the first embodiment, an image in which the values of background pixels are substituted with the average value m is stored in the memory 129. This image is read out in units of blocks in synchronism with the background/subject discrimination results from the memory 129. Of these blocks, only blocks containing subject pixels are input to the subtracter 228. At this time, the motion compensator 229 performs motion compensation on the basis of an image of a subject in a temporally immediately preceding frame stored in the memory 236 and the input image data, and outputs a motion vector and a predictive macro block.

The subtracter 228 calculates the difference between the output from the memory 129 and the predictive macro block. The DCT unit 130 performs DCT for the difference in units of blocks of 8×8 pixels, and the quantizer 132 quantizes the data.

The encoder 233 encodes the motion vector generated by the motion compensator 229 and the quantized data and outputs the encoded data from the terminal 135. At the same time, the output from the quantizer 132 is applied to the inverse quantizer 232 where the data is inversely quantized. This data is then subjected to inverse DCT by the inverse DCT unit 234, added to the output from the motion compensator 229 by the adder 235, and stored in the memory 236.

Figure 15:
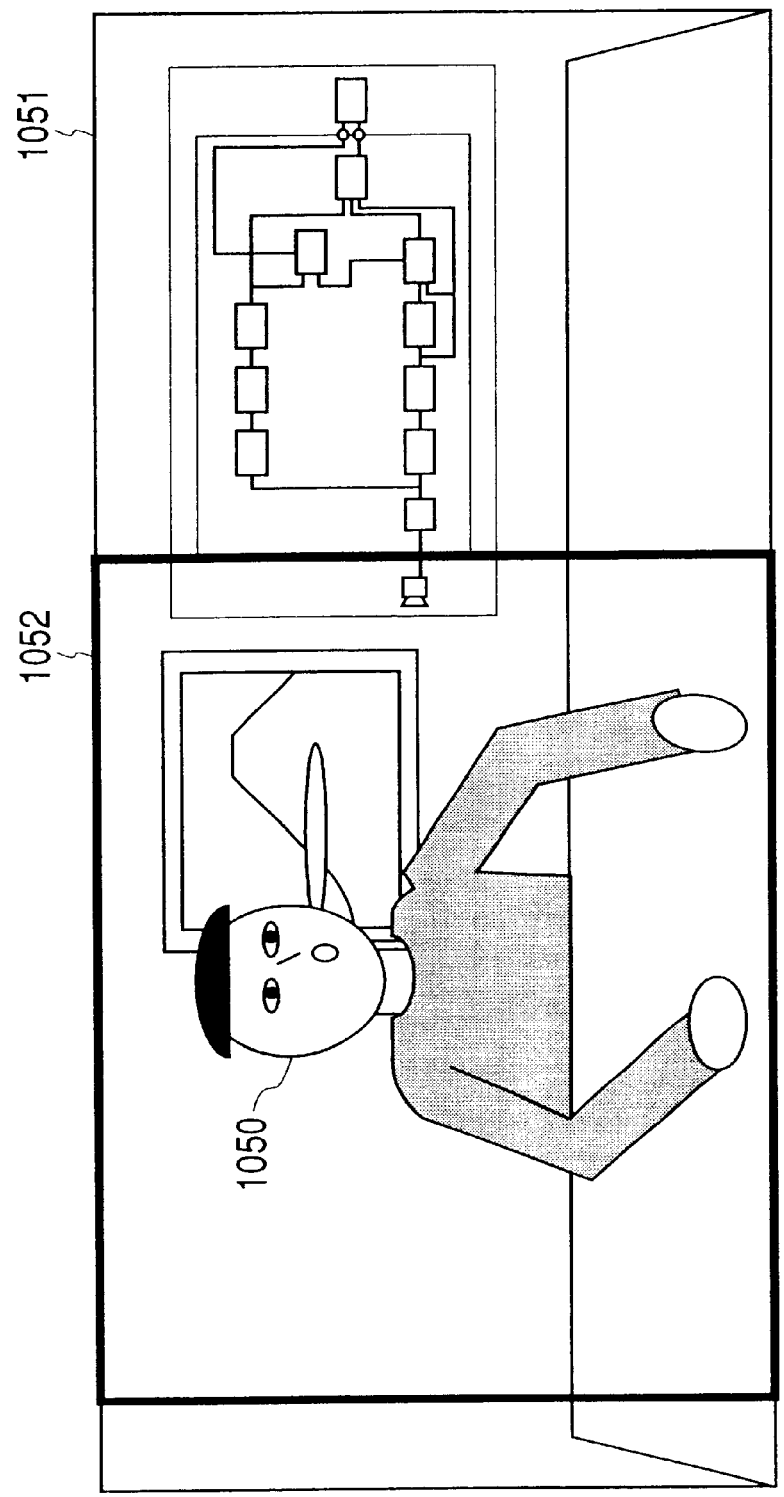
FIG. 15 is a view showing a whole image in the second embodiment.

An operation when a subject moves will be described below. When the person 1050 moves to the right in FIG. 2, the video camera 201 changes its direction to the right in accordance with the movement of the person 1050. FIG. 15 shows the way the video camera 201 moves. Referring to FIG. 15, when the person 1050 moves to the right, the visual field of the video camera 201 moves to a portion indicated by a thick frame 1052.

Figure 16:
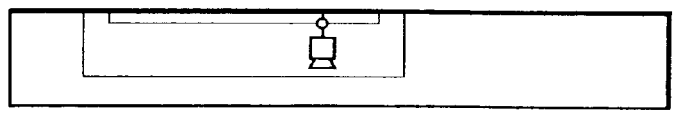
FIG. 16 is a view showing the way a background image is generated in the second embodiment.

This visual field 1052 of the video camera 201 contains a new background image. The new background image is a portion shown in FIG. 16. By detecting the direction of the video camera 201, this portion can be easily obtained from the moving amount in that direction and the directions and amounts of movements in the past.

The motion of the video camera 201 is input to the background extracting unit 205 via the terminal 204 shown in FIG. 13. An image at this point is input to the A/D converter 104 via the terminal 203. The A/D converter 104 converts the input image into a digital signal and inputs the signal to the frame memory 107 and the background extracting unit 205. On the basis of the moving amount in the direction of the video camera 201 and the past movement information, the background extracting unit 205 detects the new background image shown in FIG. 16 and adds this image to the conventional background image stored in the background memory 105 to form a new background image.

Figure 17:
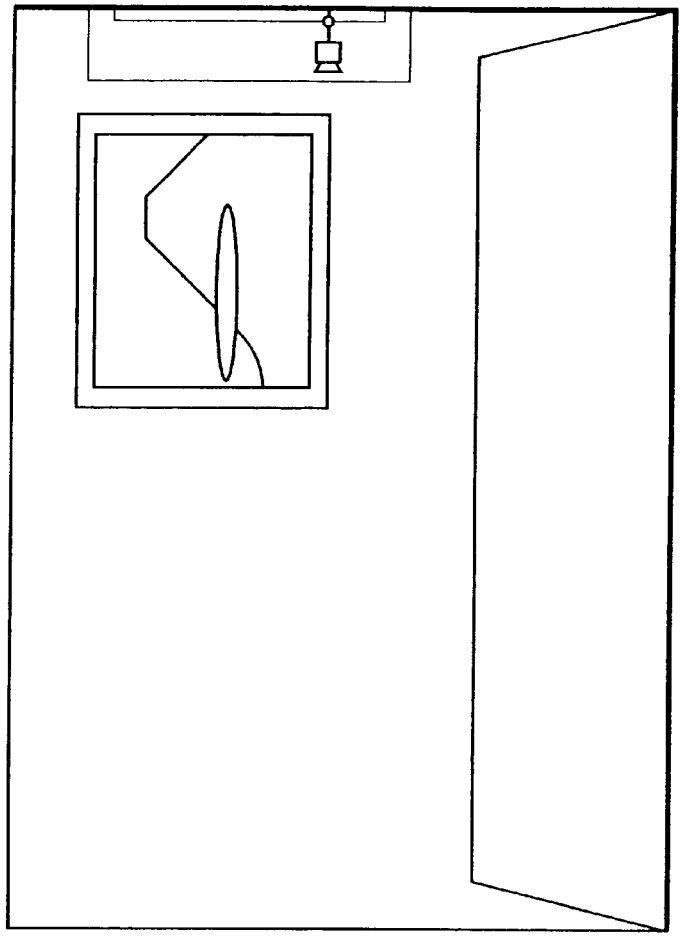
FIG. 17 is a view showing the way the background image is synthesized in the second embodiment.

FIG. 17 shows the contents of this background image. Information on this movement is held in the background extracting unit 205. This information is initialized when the video camera 201 inputs a background image for the first time.

The background extracting unit 205 supplies image data of the generated new background image to the still image encoding unit 106. The still image encoding unit 106 generates codes by using the JPEG-LS encoding scheme and supplies the codes to the code synthesization unit 112. At the same time, the code length Lb is input to the code length assignment unit 227 via the terminal 220. If the code length assignment unit 227 detects the generation of a new background image from the input code length Lb when a frame to be encoded is an I-frame, the code length assignment unit 227 changes the ratio of code lengths to be assigned to an I-frame and a P-frame to I:P:P=3:1:1.

Accordingly, the target value Ro is $$Ro = Rf \times 3 \times 6/10 \qquad (6)$$

for an I-frame, and is $$Ro = Rf \times 3 \times 2/10 \qquad (7)$$

for a P-frame. If the generation of a new background image is detected when a frame to be encoded is a P-frame, the assignment of code lengths remains unchanged. Also, if no new background image is generated when an I-frame is to be encoded, the code length ratio is returned to 8:1:1.

Additionally, if a new background image is generated in each frame, the code length assignment unit 227 subtracts the generated code length Lb from the target value Ro and sets the difference as a target value Ro' of that frame by $$Ro' = Ro - Lb \qquad (8)$$

Subsequent processing is similar to that when no new background image is generated. That is, the background/subject discrimination encoding unit 122 performs JBIG encoding for the background/subject discrimination results and outputs the obtained codes to the code synthesization unit 112 via the terminal 123.

The latch 226 holds the difference Oo between the target value Ro and the code length Lo. The quantization coefficient calculation unit 231 determines the optimum quantization coefficient Q for each frame mode. The memory 129 stores an image in which the values of background pixels are substituted with the average value m.

For an I-frame, only blocks containing subject pixels are subjected to DCT and quantized by a quantization coefficient based on the quantization coefficient Q. The encoder 233 encodes the data and outputs the encoded data from the terminal 135. Simultaneously, the output from the quantizer 132 is subjected to inverse quantization and inverse DCT by the inverse quantizer 232 and the inverse DCT unit 234, respectively, added to the output from the motion compensator 229 by the adder 235, and stored in the memory 236.

For a P-frame, the motion compensator 229 performs motion compensation on the basis of an image of a subject in a temporally immediately preceding frame stored in the memory 236 and the input image data and outputs a motion vector and a predictive macro block. The difference between the output from the memory 129 and the predictive macro block is calculated and subjected to DCT and quantization. The encoder 233 encodes the motion vector and the quantized data and outputs the encoded data from the terminal 135. At the same time, the output from the quantizer 132 is subjected to inverse quantization and inverse DCT by the inverse quantizer 232 and the inverse DCT unit 234, respectively, added to the output from the motion compensator 229 by the adder 235, and stored in the memory 236.

Referring back to FIG. 13, the encoded data generated by the moving image encoding unit 206 as described above is input to the code synthesization unit 112. The code synthesization unit 112 synthesizes the encoded data generated by the individual units to generate one encoded data.

Figure 18:
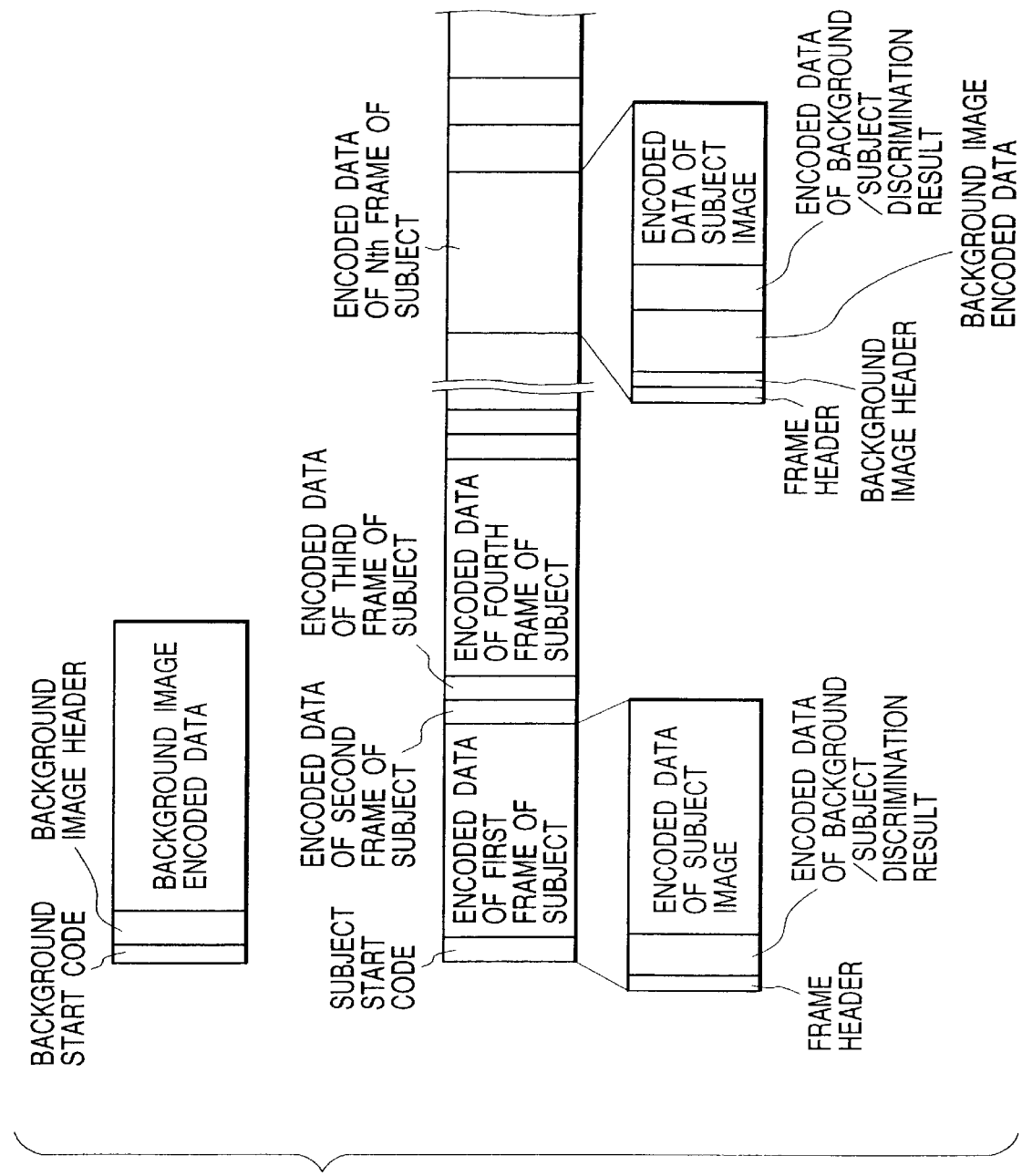
FIG. 18 is a view showing the format of encoded data in the third embodiment.

FIG. 18 shows the output encoded data from the code synthesization unit 112.

Before transmitting the sequence of a moving image, the code synthesization unit 112 separately transmits encoded data of the first background image. This data is obtained by encoding the contents shown in FIG. 4. The head of the encoded data generated by the code synthesization unit 112 contains a start code indicating that the data is encoded data of a background image. A background image header having information such as the size of the background image follows the start code. Finally, data encoded by JPEG-LS coding follows the background image header.

Subsequently, encoded data of subjects is generated. The head of the encoded data contains a start code indicating that the data is encoded data of subject images. Encoded data of first frames of individual subjects follow the start code.

A frame header is stored in the head of the encoded data of each frame. This frame header contains a code indicating whether the encoded data of this frame contains encoded data of a background image, a code indicating the size of subject output from the subject extracting unit 108, a code indicating the position of subject in a background image, and a frame encoding mode (I or P).

If no background image is contained, the frame header has a code indicating that no background image is contained. The rest is the same as in the first embodiment. That is, encoded data of the codes of the background/subject discrimination results generated by the background/subject discrimination encoding unit 122 and encoded data of a subject image are generated.

If a background image is contained (the Nth frame shown in FIG. 18), the frame header has a code indicating that the background image is contained. Data generated following this frame header are a background image header containing information such as the size of the background image to be added and the position of the background with respect to an original background, and encoded data of the background image. After that, encoded data of the codes of the background/subject discrimination results and encoded data of a subject image are generated. Even when a plurality of subjects exist, it is only necessary to generate encoded data of each subject in units of frames as in the first embodiment.

The communication interface 208 transmits the encoded data generated by the code synthesization unit 112 to an external apparatus via the terminal 113.

A decoding process is the same as in the first embodiment. That is, a code separation unit 153 detects the header and encoded data of a background image contained in each frame. A still image decoding unit 154 generates the background image from the encoded data. The image is written in a background memory in accordance with the header information.

In the second embodiment of the present invention as described above, a background image can be added, if necessary, to a wide background image, so the efficiency of encoding can be increased. In particular, since no wide image needs to be initially transmitted, a delay to the start of moving image encoding can be reduced. Furthermore, when a background image is added by changing the code length rate, it is possible to suppress temporary deterioration of the image quality caused by encoding of the background image.

In the second embodiment, a background image to be initially transmitted has the size of visual field of the video camera 201. However, it is also possible to encode a region containing a background outside the visual field in advance and writes the initial visual field position in the background image header. Consequently, it is possible to transmit a background with a comparatively high frequency in advance and add another background only when the video camera 201 points in a direction which is not initially expected.

In the second embodiment, a new background can be generated from either an I- or P-frame. However, it is readily possible to always convert the code length rate by changing the direction of the video camera 201 in synchronism with the encoding mode of the moving image encoding apparatus 202. Consequently, temporary deterioration of the image quality caused by encoding of a background image can be minimized.

In the second embodiment, the I- and P-frame modes are used in moving image encoding. However, the B mode can also be used with no problem as in MPEG coding. Furthermore, intra-frame encoding can be performed for all data.

In the second embodiment, a background image is added by detecting a change in the direction of the video camera 201. However, an additional portion of a background image can be automatically extracted, or a whole background image can be prestored in a memory.

Figure 19:
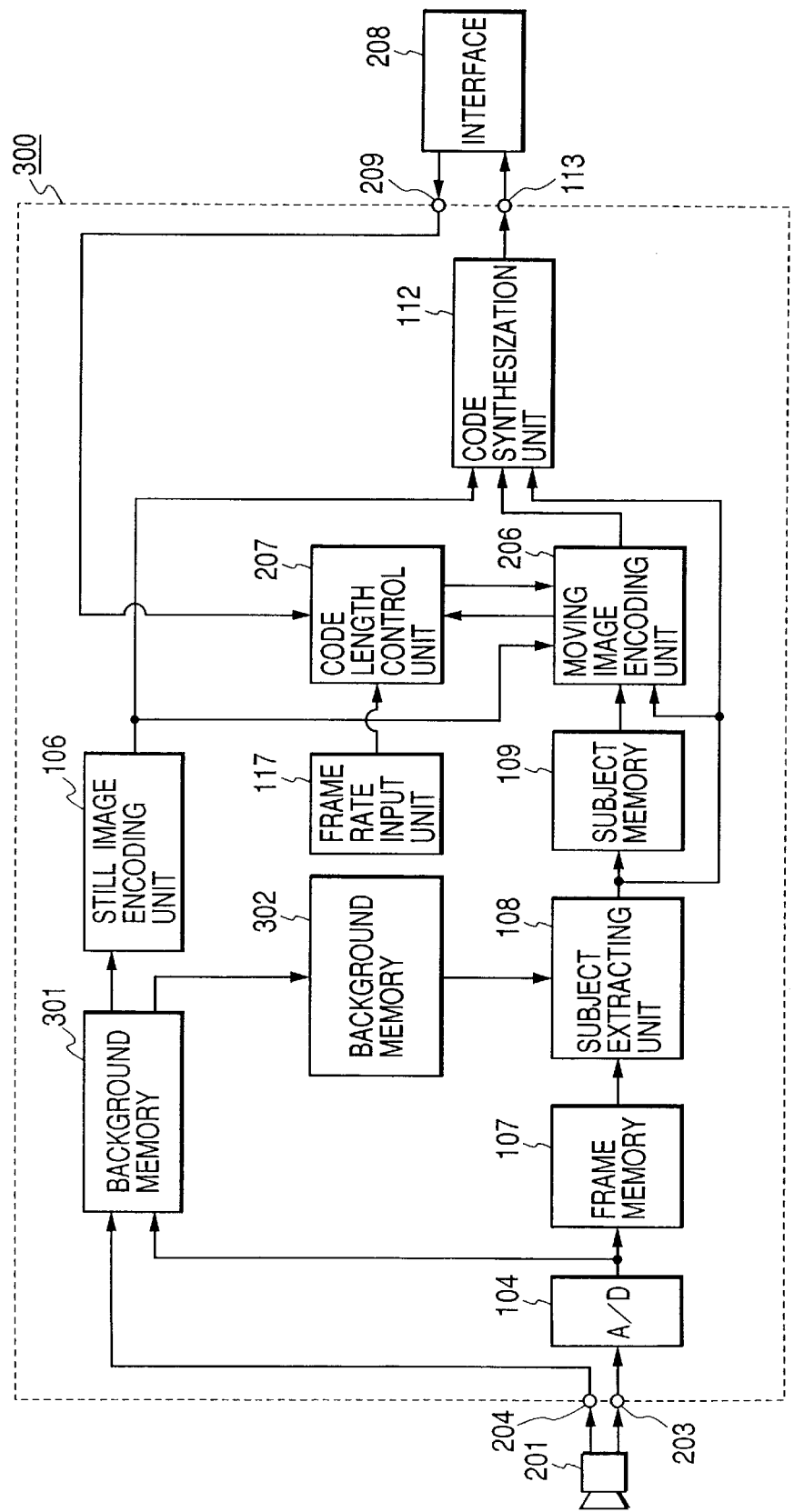
FIG. 19 is a block diagram showing the arrangement of a moving image communication apparatus according to the third embodiment of the present invention.

FIG. 19 is a block diagram showing the arrangement of a moving image communication apparatus according to the third embodiment of the present invention. The same reference numerals as in FIG. 13 denote the same parts in FIG. 19, and a detailed description thereof will be omitted.

Referring to FIG. 19, a moving image encoding apparatus 300 characterizing the present invention comprises background memories 301 and 302 for storing background images. The background memory 301 stores a whole background image, and the background memory 302 stores a portion of the background image.

The operation of the apparatus constructed as above will be described below.

Figure 20:
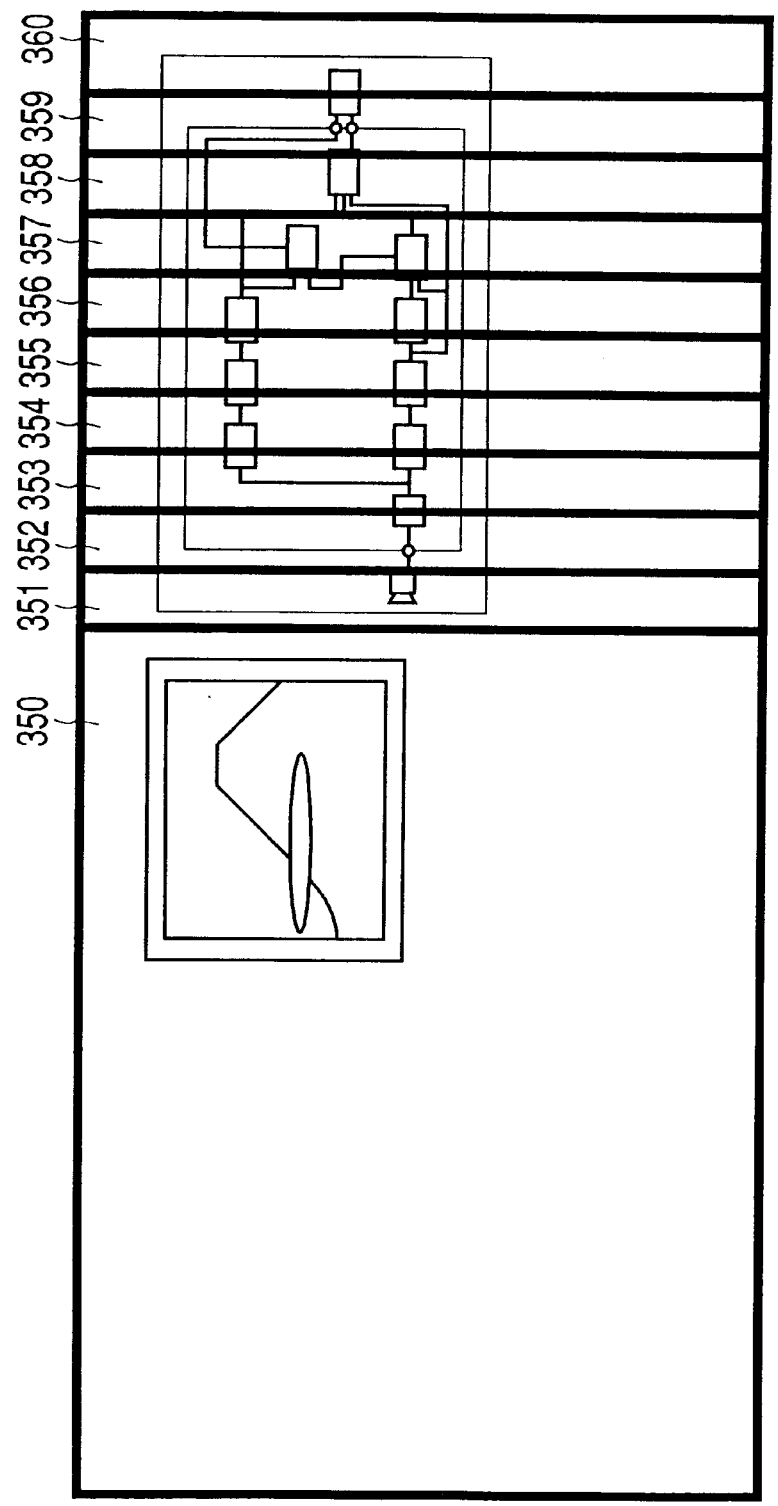
FIG. 20 is a view showing the way a background image is divided in the third embodiment.

As shown in FIG. 20, in an initial state in which no person as a subject exists, a video camera 201 inputs a background image in an entire visual field within which the video camera 201 is operable. An A/D converter 104 converts the background image input from the video camera 201 via a terminal 203 into a digital signal. The A/D converter 104 stores this digital signal in the background memory 301 by using as addresses positions in the background image calculated from the direction of the video camera 201. After the background image in the whole visual field within the operable range is stored in the background memory 301, the apparatus starts encoding.

First, as in the second embodiment, the background image in the initial state is transmitted. This background image is a visual field region 350 enclosed by the thick lines in FIG. 20. A still image encoding unit 106 encodes the image. A communication interface 208 transmits the encoded image to an external apparatus via a code synthesization unit 112 and a terminal 113. The data in the visual field region 350 is stored in the background memory 302 and used to extract a subject.

Next, the apparatus performs encoding including a subject. First, on the basis of a capacity No of a communication line and a frame rate F, a code length control unit 207 calculates an encoding rate Rf for each frame in accordance with equation (3). The apparatus starts image encoding when a person 1050 enters the visual field (FIG. 2) of the video camera 201. In this state, the position of the person 1050 remains still, and the direction of the video camera 201 is also fixed. The A/D converter 104, a frame memory 107, a subject extracting unit 108, and a subject memory 109 operate in the same manner as in the second embodiment. That is, the subject memory 109 stores image data cut out into the form of a rectangle of each subject extracted from the subject extracting unit 108 by looking up the background memory 302 and a background/subject discrimination result in the position of the subject. As in the second embodiment, a moving image encoding unit 206 performs encoding by using one I-frame and two P-frames as one encoding unit. That is, a fixed length is the length of encoded data of three frames.

Unlike in the second embodiment, although the position of the person initially remains stationary, the background image in the background memory 301 is subdivided by a code length having no large influence on encoding of a moving image, and these subdivided regions are encoded and transmitted in the third embodiment. That is, the background memory 301 subdivides a region except for the already transmitted background image into regions 351 to 360 (FIG. 20), encodes these regions 351 to 360, and adds the encoded data to each frame. If, however, the visual field of the video camera 201 comes to the region of an untransmitted background image, this portion is preferentially processed as in the second embodiment.

The subdivided regions are input to the still image encoding unit 106. The encoded data and a code length Lb are input to the code synthesization unit 112 and a code length assignment unit 227, respectively. The code length assignment unit 227 sets the ratio of code lengths to be assigned to an I-frame and a P-frame to I:P:P=14:3:3. As in the second embodiment, a background/subject discrimination encoding unit 122 performs JBIG encoding for background/subject discrimination results. I- and P-frames are encoded in accordance with a quantization parameter Q optimum for a difference Oo held in a latch 226.

If the subject moves, a change in the direction is detected from the video camera 201, and the contents of the background memory 302 are changed in accordance with the direction change. A background image necessary to extract a necessary subject image is read out from the background memory 301 and updated.

The encoded data generated by the still image encoding unit 106 and the moving image encoding unit 206 are input to the code synthesization unit 112. The code synthesization unit 112 synthesizes the codes generated by the individual units to generate one encoded data.

Figure 21:
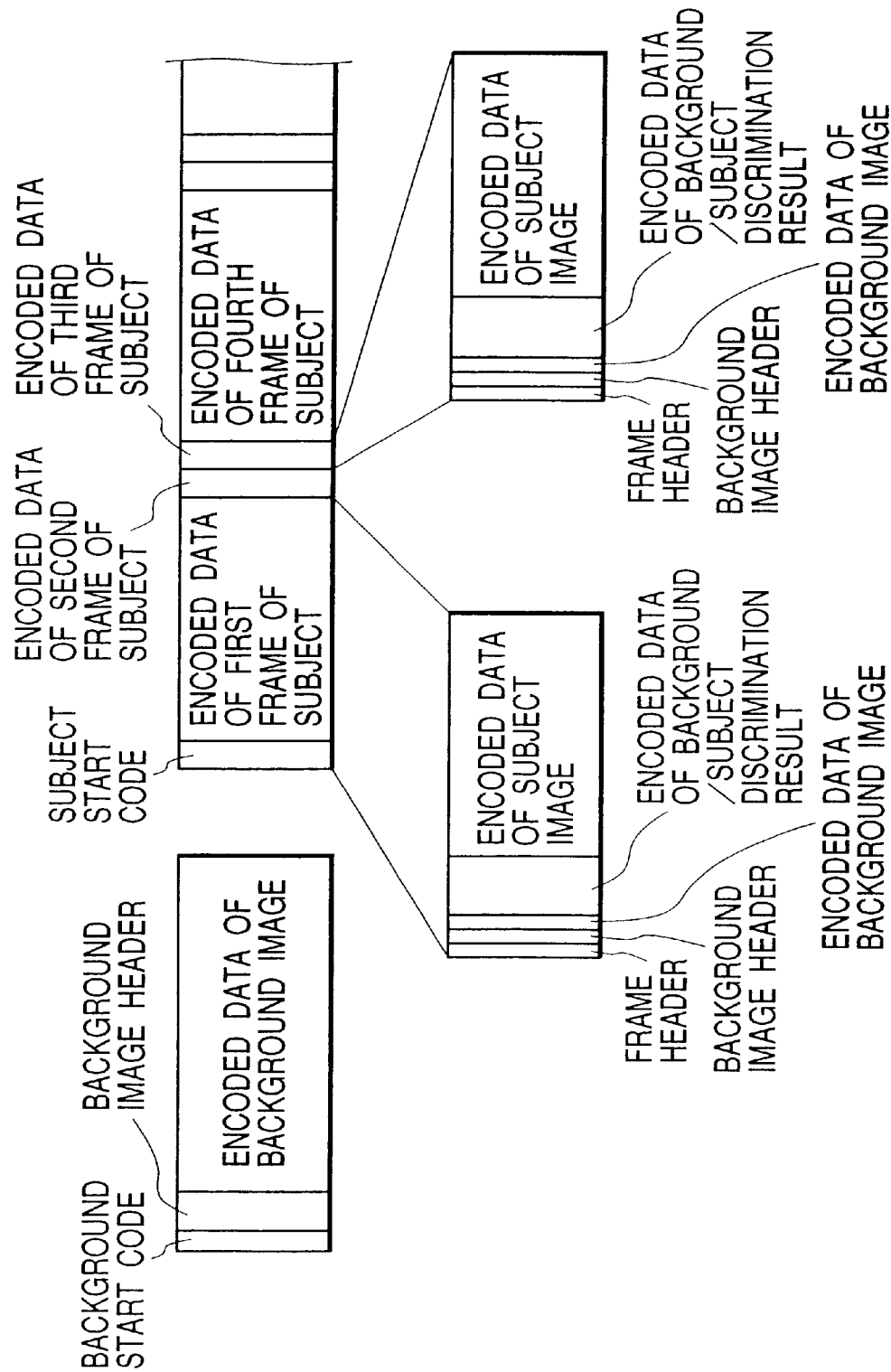
FIG. 21 is a view showing the format of encoded data in the third embodiment.

FIG. 21 shows the output encoded data from the code synthesization unit 112.

As in the second embodiment, before transmitting the sequence of a moving image, the code synthesization unit 112 separately transmits encoded data of the first background image. This data is obtained by encoding the contents of the visual field region 350 shown in FIG. 20. The head of the encoded data generated by the code synthesization unit 112 contains a start code indicating that the data is encoded data of a background image. A background image header having information such as the size of the background image follows the start code. Finally, data encoded by JPEG-LS coding follows the background image header.

Subsequently, the code synthesization unit 112 synthesizes encoded data of subjects. The head of the encoded data contains a start code indicating that the data is encoded data of subject images. Encoded data of the first frames of individual subjects follow the start code.

A frame header is stored in the head of the encoded data of each frame. This frame header contains a code indicating whether the encoded data of this frame contains encoded data of a background image, a code indicating the size of subject output from the subject extracting unit 108, a code indicating the position of subject in a background image, and a frame encoding mode (I or P). Data generated following this frame header are a background image header containing information such as the size of the background image to be added and the position of the background with respect to the original background, and encoded data of the background image. After that, encoded data of the codes of the background/subject discrimination results and encoded data of a subject image are generated. Even when a plurality of subjects exist, it is only necessary to generate encoded data of each subject in units of frames as in the first embodiment.

The communication interface 208 transmits the encoded data generated by the code synthesization unit 112 to an external apparatus via the terminal 113.

A decoding process is the same as in the first embodiment. That is, a code separation unit 153 detects the header and encoded data of a background image contained in each frame. A still image decoding unit 154 generates the background image from the encoded data. The image is written in a background memory in accordance with the header information.

In the second embodiment described earlier, portions to be added are transmitted if necessary. In this third embodiment as described above, however, a background image is subdivided, and these subdivided regions are added little by little to each frame and transmitted. Since this allows a decoding apparatus to prepare a background image beforehand, the image quality does not temporarily deteriorate when a new background is generated.

In the third embodiment, an image is subdivided only in the horizontal direction. However, it is naturally possible to subdivide an image in the vertical direction. Also, in the third embodiment, a background image extends only in the horizontal direction for the sake of simplicity of explanation. The present invention, however, is of course not limited to this condition of the embodiment. Furthermore, the number of subdivided regions and the encoding order are not limited to those of the embodiment.

Figure 22:
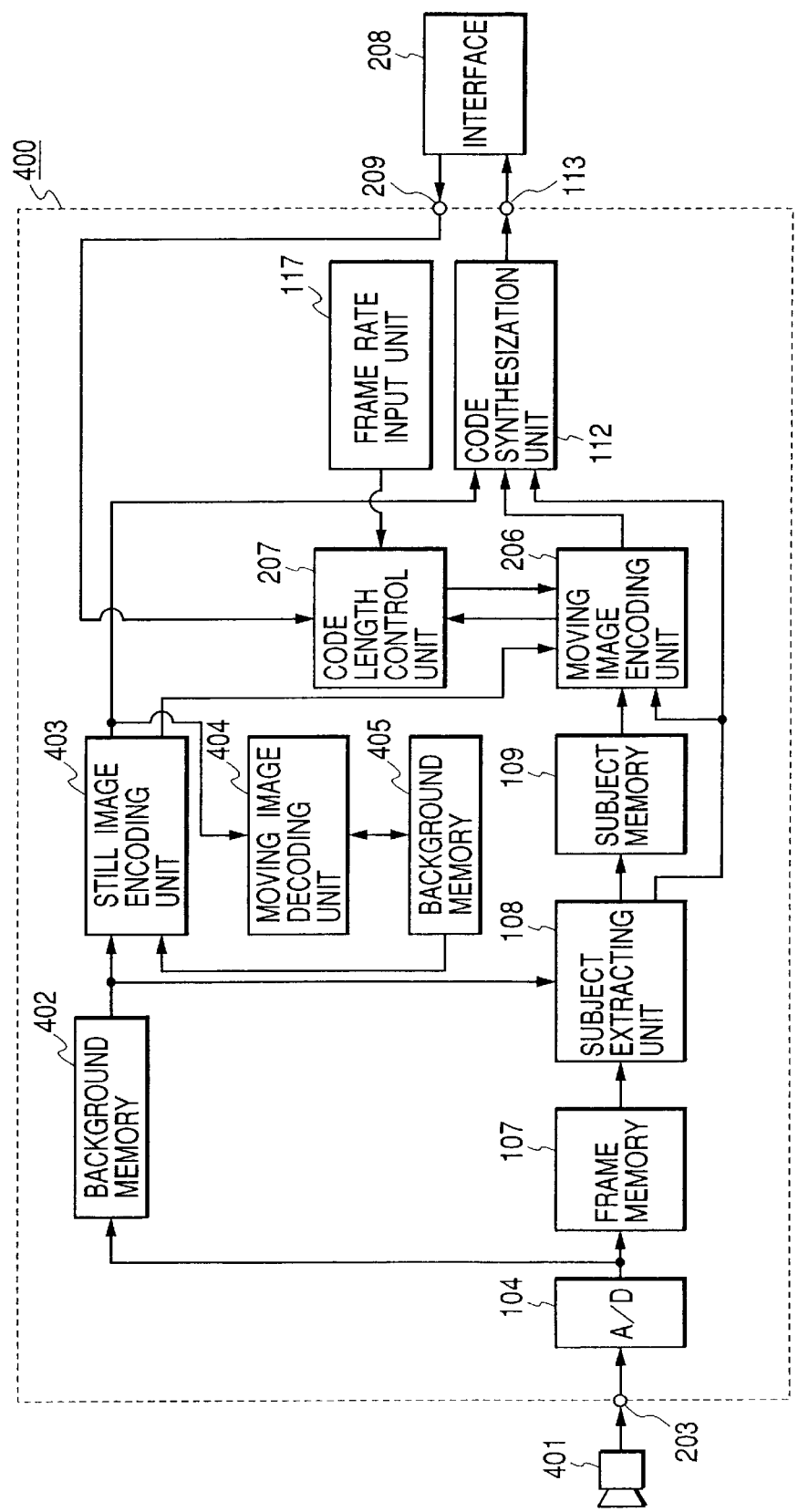
FIG. 22 is a block diagram showing the arrangement of a moving image communication apparatus according to the fourth embodiment of the present invention.

FIG. 22 is a block diagram showing the arrangement of a moving image communication apparatus according to the fourth embodiment of the present invention. The same reference numerals as in FIG. 19 denote the same parts in FIG. 22, and a detailed description thereof will be omitted.

Referring to FIG. 22, a moving image encoding apparatus 400 characterizing the present invention comprises a video camera 401 obtained by omitting the function of a pan head and the function of transmitting direction information from the video camera 401 of the second embodiment.

Background memories 402 and 405 store background images. A still image encoding unit 403 hierarchically encodes a still image. That is, the still image encoding unit 403 first generates and encodes a coarse image and then generates encoded data for improving the resolution step by step. This encoding is, e.g., JPEG hierarchical encoding or sub-band encoding of orthogonal transformation such as Wavelet transform or DCT. This fourth embodiment uses a scheme similar to JPEG hierarchical encoding. A still image decoding unit 404 hierarchically decodes the encoded data generated by the still image encoding unit 403.

The operation of the apparatus constructed as above will be described below.

First, as in the first embodiment, before encoding is performed, a background image is input from the video camera 401 and stored in the background memory 402.

At the beginning of encoding, the still image encoding unit 403 first encodes the contents of the background memory 402 by a large quantization coefficient and inputs the encoded image data to a code synthesization unit 112. The encoded data generated by the still image encoding unit 403 is also applied to the still image decoding unit 404 where the data is decoded. The decoded image is stored in the background memory 405.

Next, the apparatus encodes an image containing a subject. First, a code length control unit 207 calculates an encoding rate Rf for each frame in accordance with equation (3). An A/D converter 104, a frame memory 107, a subject extracting unit 108, and a subject memory 109 operate in the same manner as in the third embodiment. The subject memory 109 stores the extracted subject.

As in the second embodiment, a moving image encoding unit 206 performs encoding by using one I-frame and two P-frames as one encoding unit. That is, a fixed length is the length of encoded data of three frames.

Unlike in the third embodiment, the still image encoding unit 403 generates, from the background memory 402 in units of frames, hierarchically encoded data for improving the resolution by using a code length having no large influence on encoding of a moving image, while looking up the contents of the background memory 405 in the fourth embodiment. The encoded image data and the code length are input to the code synthesization unit 112 and the moving image encoding unit 206, respectively. The moving image encoding unit 206 encodes the subject as in the second and third embodiments.

The code synthesization unit 112 synthesizes the encoded data of the subject. The structure of codes obtained by the synthesization is the same as the structure of the encoded data shown in FIG. 21 of the third embodiment except for the contents of each background image header and background image encoded data.

The background image header contains hierarchy information indicating the order of hierarchy, instead of the position with respect to an original background. Similarly, the background image encoded data is not encoded data of subdivided background images but hierarchically encoded data for improving the resolution. Even when a plurality of subjects exist, it is only necessary to generate encoded data of each subject in units of frames as in the first embodiment.

A communication interface 208 transmits the encoded data generated by the code synthesization unit 112 to an external apparatus via a terminal 113.

A decoding process is the same as in the first embodiment. That is, a code separation unit 153 detects the header and encoded data of a background image contained in each frame. A still image decoding unit 154 generates the background image from the encoded data and updates the background image using the decoded background image and data.

In the fourth embodiment as described above, a coarsely quantized background image is first transmitted to reduce a delay caused by the transmission of a background image to be initially transmitted. The amount of hierarchically encoded data for improving the image quality is smaller than the amount of encoded data of a moving image. Therefore, this hierarchically encoded data does not greatly take codes from a moving image itself and has no large influence on the image quality.

Also, the code length of a hierarchical code can be transmitted by a fixed code length. This makes whole code length control easy to perform.

The present invention is not limited to the above embodiments and can be applied to a system constituted by a plurality of devices (e.g., a host computer, interface, reader, and printer) or to an apparatus (e.g., a digital VTR, digital camera, or digital television set) comprising a single device.

Further, the object of the present invention can also be achieved by providing program codes of software for performing the aforesaid functions of the embodiments to an internal computer of an apparatus or system connected to various devices so as to operate these devices to realize the functions of the embodiments, and allowing the computer (e.g., a CPU or MPU) of the system or apparatus to operate the devices in accordance with the stored programs.

In this case, the program codes of the software realize the functions of the above embodiments, so the program codes themselves and a means for supplying the program codes to the computer, e.g., a storage medium storing the program codes constitute the invention.

As this storage medium for storing the program codes, it is possible to use, e.g., a floppy disk, hard disk, optical disk, magnetooptical disk, CD-ROM, magnetic tape, nonvolatile memory card, or ROM.

Furthermore, besides the aforesaid functions according to the above embodiments are realized by executing program codes supplied to a computer, the present invention includes program codes which realize the functions of the embodiments together with an OS (Operating System) or another application software working on a computer.

Furthermore, the present invention also includes a case where, after supplied program codes are stored in an internal function extension board of a computer or in a memory of a function extension unit connected to the computer, a CPU or the like contained in the function extension board or unit performs a part or entire process in accordance with designations of the program codes and realizes functions of the above embodiments.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) input means for inputting moving image data;
   b) separating means for separating a plurality of objects from the input moving image data from said input means;

c) first encoding means for encoding a first object, separated by said separating means, by a first encoding method;

d) second encoding means for encoding a second object, separated by said separating means, by a second encoding method, wherein said first encoding means and said second encoding means are arranged independently of each other;

e) control means for controlling a code amount of the second object in accordance with a code amount of the first object generated by said first encoding means, while said control means does not control the code amount of the first object in accordance with the code amount of the second object; and f) synthesizing means for synthesizing first encoded data which is encoded by said first encoding means, and second encoded data which is encoded by said second encoding means.

2. An apparatus according to claim 1, wherein said second encoding means comprises quantizing means, and said control means comprises setting means for setting a frame rate and controls a quantization step of said quantizing means in accordance with an output from said setting means.

3. An apparatus according to claim 1, wherein said second encoding means comprises quantizing means and recording means for recording the encoded data generated by said first and second encoding means on a recording medium, and said control means controls a quantization step of said quantizing means in accordance with a capacity of said recording medium.

4. An apparatus according to claim 1, wherein said second encoding means comprises quantizing means and communicating means for communicating the encoded data, generated by said first and second encoding means, by using an external transmission path, and said control means controls a quantization step of said quantizing means in accordance with a communication data rate of said communicating means.

5. An apparatus according to claim 1, wherein said separating means discriminates and separates a plurality of objects in accordance with movement of image data.

6. An apparatus according to claim 1, wherein said separating means discriminates and separates a plurality of objects in accordance with a pixel value difference between frames.

7. An apparatus according to claim 1, wherein said separating means separates at least a background image and a remaining image.

8. An apparatus according to claim 1, wherein said first encoding means performs hierarchical encoding.

9. An apparatus according to claim 1, wherein said first encoding means performs JPEG encoding.

10. An apparatus according to claim 1, wherein said second encoding means performs encoding by selectively using intra-frame encoding and inter-frame encoding.

11. An apparatus according to claim 1, wherein said synthesizing means divisionally synthesizes encoded data of the first object.

12. An apparatus according to claim 1, wherein said synthesizing means also synthesizes information indicating an attribute of each object.

13. An apparatus according to claim 1, further comprising recording means for recording encoded data obtained by said synthesizing means.

14. An apparatus according to claim 1, further comprising interface means for communicating encoded data obtained by said synthesizing means.

15. An apparatus according to claim 1, wherein said input means comprises a video camera.

16. An apparatus according to claim 15, wherein said separating means receives imaging information indicating an imaging state from said video camera and separates objects of the same kind from the image data in accordance with the imaging information.

17. An apparatus according to claim 1, wherein said input means comprises a video recorder.

18. An apparatus according to claim 1, wherein the first object is a background image in the image data.

19. An image processing method comprising the steps of:

a) separating a plurality of objects from input moving image data;

b) encoding a separated first object by a first encoding method using first encoding means;

c) encoding a separated second object by a second encoding method using second encoding means, wherein the first encoding means and the second encoding means are arranged independently of each other;

d) controlling a code amount of the second object in accordance with a code amount of the first object while not controlling the code amount of the first object in accordance with the code amount of the second object; and e) synthesizing first encoded data which is encoded in said encoding step using the first encoding means, and second encoded data which is encoded in said encoding step using the second encoding means.

20. An image decoding apparatus for decoding synthetic encoded data obtained by separating first and second objects from input moving image data, encoding the first object by a first encoding method using first encoding means, encoding the second object by a second encoding method using second encoding means which is arranged independently of the first encoding means while a code amount of the second object is controlled in accordance with a code amount of the first object and the code amount of the first object is not controlled in accordance with the code amount of the second object, synthesizing the encoded data of the first object and the encoded data of the second object, and transmitting synthetic data, comprising:

a) separating means for separating the synthetic encoded data into the encoded data of the first object and the encoded data of the second object;

b) first decoding means for decoding the encoded data of the first object separated by said separating means; and c) second decoding means for decoding the encoded data of the second object separated by said separating means.

21. An apparatus according to claim 20, further comprising synthesizing means for synthesizing outputs from said first and second decoding means.

22. An apparatus according to claim 21, further comprising display means for displaying synthetic data generated by said synthesizing means.

23. An image decoding method of decoding synthetic encoded data obtained by separating first and second objects from input moving image data, encoding the first object by a first encoding method using first encoding means, encoding the second object by a second encoding method using second encoding means which is arranged independently of the first encoding means while a code amount of the second object is controlled in accordance with a code amount of the first object and the code amount of the first object is not controlled in accordance with the code amount of the second object, synthesizing the encoded data of the first object and the encoded data of the second object, and transmitting synthetic data, comprising the steps of:

a) separating the synthetic encoded data into the encoded data of the first object and the encoded data of the second object;

b) decoding the encoded data of the separated first object; and c) decoding the encoded data of the separated second object.

24. An image processing apparatus comprising:

a) input means for inputting moving image data;

b) separating means for separating a plurality of objects from the input moving image data from said input means;

c) first encoding means for encoding a first object, separated by said separating means, by a first encoding method;

d) second encoding means for encoding a second object, separated by said separating means, by a second encoding method; and e) control means for controlling a code amount of the second object in accordance with a code amount of the first object generated by said first encoding means, while said control means does not control the code amount of the first object in accordance with the code amount of the second object.

25. An image processing method comprising the steps of:

a) inputting moving image data;

b) separating a plurality of objects from the input moving image data provided in said inputting step;

c) encoding a first object, separated in said separating step, by a first encoding method;

d) encoding a second object, separated in said separating step, by a second encoding method; and e) controlling a code amount of the second object in accordance with a code amount of the first object generated in said first object encoding step, while said control means does not control the code amount of the first object in accordance with the code amount of the second object.

26. A storage medium which computer-readably stores a program for executing an image processing method, said image processing method comprising the steps of:

a) inputting moving image data;

b) separating a plurality of objects from the input moving image data provided in said inputting step;

c) encoding a first object, separated in said separating step, by a first encoding method;

d) encoding a second object, separated in said separating step, by a second encoding method; and e) controlling a code amount of the second object in accordance with a code amount of the first object generated in said first object encoding step, while said control means does not control the code amount of the first object in accordance with the code amount of the second object.

27. A storage medium which computer-readably stores a program for executing an image decoding method of decoding synthetic encoded data obtained by separating first and second objects from input moving image data, encoding the first object by a first encoding method using first encoding means, encoding the second object by a second encoding method using second encoding means which is arranged independently of the first encoding means while a code amount of the second object is controlled in accordance with a code amount of the first object and the code amount of the first object is not controlled in accordance with the code amount of the second object, synthesizing the encoded data of the first object and the encoded data of the second object, and transmitting synthetic data, said image decoding method comprising the steps of:

a) separating the synthetic encoded data into the encoded data of the first object and the encoded data of the second object;

b) decoding the encoded data of the separated first object; and c) decoding the encoded data of the separated second object.

* * * * *

UNITED STATES PATENT AND TRADEMARK OFFICE
CERTIFICATE OF CORRECTION

PATENT NO. : 6,798,977 B2  Page 1 of 1
APPLICATION NO. : 09/241871
DATED : September 28, 2004
INVENTOR(S) : Mitsuru Maeda It is certified that error appears in the above-identified patent and that said Letters Patent is hereby corrected as shown below:

ON COVER PAGE AT (*) NOTICE

Insert: --This patent issued on a continued prosecution application filed under 37 CFR 1.53(d), and is subject to the twenty year patent term provisions of 35 U.S.C. 154(a)(2).--.

COLUMN 2

Line 61, "no enough" should read --not enough--.

Signed and Sealed this

Twenty-fourth Day of October, 2006

JON W. DUDAS
*Director of the United States Patent and Trademark Office*